(12) United States Patent
Kobayashi et al.

(10) Patent No.: US 9,669,652 B2
(45) Date of Patent: Jun. 6, 2017

(54) APPLICATOR PRODUCT

(71) Applicant: KOKUYO S&T Co., Ltd., Osaka (JP)

(72) Inventors: Shogo Kobayashi, Osaka (JP); Koji Gamoh, Osaka (JP)

(73) Assignee: KOKUYO CO., LTD., Osaka (JP)

( * ) Notice: Subject to any disclaimer, the term of this patent is extended or adjusted under 35 U.S.C. 154(b) by 214 days.

(21) Appl. No.: 14/440,318

(22) PCT Filed: Dec. 25, 2012

(86) PCT No.: PCT/JP2012/083401
§ 371 (c)(1),
(2) Date: May 1, 2015

(87) PCT Pub. No.: WO2014/068799
PCT Pub. Date: May 8, 2014

(65) Prior Publication Data
US 2015/0314637 A1 Nov. 5, 2015

(30) Foreign Application Priority Data

Nov. 2, 2012 (JP) ................................. 2012-242692

(51) Int. Cl.
*B43M 11/06* (2006.01)
*B05C 9/08* (2006.01)
*C09J 4/00* (2006.01)

(52) U.S. Cl.
CPC .............. *B43M 11/06* (2013.01); *B05C 9/08* (2013.01); *C09J 4/00* (2013.01)

(58) Field of Classification Search
CPC combination set(s) only.
See application file for complete search history.

(56) References Cited

U.S. PATENT DOCUMENTS 2,531,641 A * 11/1950 Perrigo ................. B65D 35/24
   116/200
2,713,848 A * 7/1955 Miessner ................ B43K 5/00
   401/183

FOREIGN PATENT DOCUMENTS

| EP | 0 155 471 A2 | 9/1985 |
|---|---|---|
| EP | 1 637 570 A1 | 3/2006 |
| GB | 714211 A | 8/1954 |
| JP | H04-360886 A | 12/1992 |
| JP | H 11-70795 A | 3/1999 |

(Continued)

OTHER PUBLICATIONS

Extended European Search Report dated Oct. 14, 2015.

(Continued)

*Primary Examiner* — David Walczak
(74) *Attorney, Agent, or Firm* — McGinn IP Law Group, PLLC

(57) ABSTRACT

This applicator product, in a section thereof for guiding an adhesive B from a container body 1 towards a top portion 64 and including at least the top portion 64, is furnished with a see-through passage 6*a* of translucent constitution such that the adhesive B is visible from the outside, whereby it is possible to apply a desired quantity of the adhesive B to an object, and to do so over a desired location and surface area. A cap 7 covers a nozzle 6, maintaining the adhesive B constituting the application material within the see-through passage 6*a* in a state of being shielded from visible light, so that the adhesive B retains stable coloration.

12 Claims, 29 Drawing Sheets

(56) References Cited

FOREIGN PATENT DOCUMENTS

| | | |
|---|---|---|
| JP | 2001-342430 A | 12/2001 |
| JP | 2005-225006 A | 8/2005 |
| JP | 3722815 B2 | 11/2005 |
| JP | 2006-111863 A | 4/2006 |
| JP | 3131292 U | 4/2007 |
| JP | 2007-119013 A | 5/2007 |
| JP | 4499443 B2 | 7/2010 |
| JP | 4578623 B2 | 11/2010 |
| JP | 2013-010184 A | 1/2013 |
| UA | 25769 U | 8/2007 |
| WO | WO 2013/001992 A1 | 1/2013 |

OTHER PUBLICATIONS

Japanese Office Action dated Jul. 5, 2016.
International Search Report (ISR) (PCT Form PCT/ISA/210), in PCT/JP2012/083401, dated Apr. 2, 2013.
"Kokuyo 2012 Catalog, stationery", Kokuyo Co., Ltd., issued in Dec. 2011, p. 489.
"Kokuyo 2012 Catalog, stationery", Kokuyo Co., Ltd., issued in Dec. 2011, p. 491.

* cited by examiner

APPLICATOR PRODUCT

TECHNICAL FIELD

The present invention relates to an applicator product to apply an application material such as glue and adhesive to an object.

BACKGROUND ART

Conventionally, there have been proposed various applicator products with application materials that are decolorized or change their color as soon as applied to an object. Here, "applicator product" refers to products for applying application materials, for example, glue, adhesive, colorant such as ink, oil and others, in general.

As one of the those corresponding to the applicator products described above, what is called a stick glue is cited (see Non-Patent Document 1, for example). In the stick glue, a sealed container contains a solid glue exhibiting alkalinity into which a pH indicator is mixed so that the solid glue is in colored state. After the solid glue in colored state is applied, the color of the pH indicator fades away by exposure to air, that is, the glue is decolorized. Such glues have not only an advantage that an area where the glue is not applied to is easily found out because an area where the glue is applied to is clearly visible for an user just after applying, but also another advantage that the area where the glue is applied to fades after that and becomes inconspicuous. These advantages are a big factor that such glues are used widely.

By the way, photochromic compounds that develop colors by irradiation of light with a specific wavelength and are decolorized by irradiation of light with another specific wavelength are known. Many of the photochromic compounds have such a characteristic that those are capable of being colored clearly by irradiation of ultraviolet light with a specific wavelength and become colorless by irradiation of visible light with a specific wavelength. And, writing implements such as marker pens using the photochromic compounds are known as an example of applicator products with using the photochromic compounds (see Patent Documents 1 and 2, for example).

Now, there have been proposed applicator products in which a container to contain an application material or a nozzle to apply the application material directly is transparent or translucent so that the application material is visible from outside when or just before applied, in order to apply more accurate amount of the application material to an object or apply the application material to more accurate place or area on the object (see Non-Patent Document 2, for example).

However, when the application materials with the photochromic compounds are used in such applicator products as described above, the application materials cannot maintain those colored state on a long-term basis and are gradually decolorized depending on environments where the applicator products are stored because the application materials lose those colors by irradiation of light under natural conditions.

Patent Documents

Patent Document 1: Japanese Patent No. 3722815.
Patent Document 2: Japanese Utility Model No. 3131292.

Non-Patent Documents

Non-Patent document 1: "Kokuyo 2012 Catalog, stationery", Kokuyo Co., Ltd., issued in December, 2011, P. 489.
Non-Patent document 2: "Kokuyo 2012 Catalog, stationery", Kokuyo Co., Ltd., issued in December, 2011, P. 491 (see right column in middle part and right column in lower part).

SUMMARY OF THE INVENTION

Problems to be Solved by the Invention

The present invention has paid attention to the above-described points, it is an object of the present invention to provide an applicator product which facilitates viewing an application material just before applied to an object so as to contribute to applying accurate amount of the application material to an object or applying the application material to accurate area as well as has such a characteristic that the area where the application material is applied to is capable of fading after that and becoming inconspicuous.

Means of Solving the Problems

In order to realize the above object, the present invention has prepared the following means.

That is, an applicator product according to the present invention is characterized in that it includes an application material to which a photochromic compound that develops a color by irradiation of ultraviolet light with a certain wavelength and is decolorized by irradiation of light under natural conditions is added so that the application material transits from colored state to decolorized state when it is irradiated with the light under natural conditions, a container body that contains the application material in the colored state and shields the application material from visible light, a see-through nozzle that has a top portion projecting from the container body to apply the application material to an object, and a see-through passage provided in at least a part including the top portion to guide the application material from the container body to the top portion, the see-through passage being transparent or translucent so that the application material is visible from outside, and a light-shielding cap being attached to the container body or the see-through nozzle to shield the application material in the see-through passage from visible light.

Here, "light under natural conditions" means sunlight or light under the condition where an interior lamp or light irradiates. Specifically, it is mainly visible light with about 5 to 6% ultraviolet light contained in sunlight or a minute quantity of ultraviolet light contained in fluorescent light. In other words, the light under natural conditions contains ultraviolet light in the same proportion as sunlight or lower proportion than sunlight.

In addition, "decolorized state" refers to not only being completely colorless but also becoming discolored to come closer to colorless or maintaining discoloration.

Such configuration facilitates controlling the amount of the application material applied from the top portion or the area where the application material is applied to precisely, because the attached cap maintains the colored state stably and the application material guided from the see-through pass to the top portion in the see-through nozzle is easily visible while the application material is applied. Moreover, the area where the application material is applied to is easily confirmed, the area where the application material is not applied to is easily found out. Also, hence the application material transits to the decolorized state by the light under natural conditions, the applicator product that is able to make the trace of the applied material inconspicuous can be fabricated. According to the present invention, the applicator product is provided which facilitates viewing the application material just before applied to an object so as to contribute to applying accurate amount of the application material to an object or applying the application material to accurate area as well as has such a characteristic that the area where the application material is applied to is capable of fading after that and becoming inconspicuous.

In order to obtain the one that is able to maintain the colored state, it is desirable that the photochromic compound be a diarylethene-based photochromic compound.

The diarylethene-based photochromic compound to be used in the present invention is specifically such that ring-opening reaction by visible light proceeds in preference to ring-closure reaction by ultraviolet light when it is irradiated with sunlight, which contains 5 to 6% ultraviolet light. Such diarylethene-based photochromic compounds stably cause the decolorized state stably under the conditions where the sun irradiates or the natural conditions where an interior lamp or light irradiates.

A value called "reactive quantum yield" is used as a general index for the ring-opening reaction and the ring-closure reaction of the diarylethene-based photochromic compound. In particular, the diarylethene-based photochromic compound to be used in the present invention displays high values for the reactive quantum yield displayed during the ring-opening reaction when becoming colorless nearly as high as the reactive quantum yield displayed during the ring-closure reaction. As an example of such diarylethene-based photochromic compounds, 1,2-Bis(2-methylbenzo(b) thiophen-3-yl)hexafluorocyclopentene can be cited. However, any compound that exhibits a color by irradiation of ultraviolet light with a certain wavelength and is decolorized by irradiation of light under natural conditions is appropriate even though it is existing one other than the above compound or will be found in the future.

In order for the color due to the photochromic compound to be further reflected onto exhibited color by the application material, it is desirable that the application material have been added with 0.005 to 5.0 wt % (weight percent), preferably 0.05 to 3.0 wt %, or further preferably 0.1 to 1.0 wt % of the photochromic compound in relation to a base substance to which the photochromic compound is added. Because it is difficult for the color due to the colored state to be effectively displayed when the added amount of the photochromic compound is less than 0.1 wt %, it is also difficult for an improvement of visibility in the colored state that makes it worth the increase in the added amount to be present when the added amount of the photochromic compound is greater than 1.0 wt %.

As a mode to facilitate viewing the application material more, it is desirable that the see-through nozzle be integrally formed of a transparent or translucent resin.

In order to facilitate viewing the application material especially when applied to an object and be able to apply it to the object accurately, it is preferable that the top portion be formed to be thin.

In order to facilitate controlling the position or the area where the application material is applied to and contribute to more accurate applying, it is desirable that the top portion have a top end face that is slanted relatively with the longitudinal direction of the see-through nozzle.

As a example of the applicator product according to the present invention to be used suitably, a mode in which the application material is a liquid adhesive can be cited.

As a example of the applicator product that makes good use of the color developing by the photochromic compound, what is called an instant glue including cyanoacrylate can be cited.

In order to ensure that the application material is able to transit to the decolorized state when it is irradiated with the light under natural conditions, it is preferable that the application material include an ultraviolet absorber. Hence, the decolorized state is maintained in an effective manner, the application material can be effectively prevented from redeveloping the color by irradiation of sunlight.

And, in order to emphasize the difference in color between the area where the application material is applied to and the area where it is not applied to on an object so as to show the area where the application material is applied to clearly and attract a user's attention as well as to prevent the application material just after applied from contacting the user erroneously, it is preferable that the application material exhibit red in the colored state.

Effects of the Invention

According to the present invention, an applicator product can be provided which facilitates viewing an application material just before applied to an object so as to contribute to applying accurate amount of the application material to an object or applying the application material to accurate area as well as has such a characteristic that the area where the application material is applied to is capable of fading after that and becoming inconspicuous.

MODE FOR CARRYING OUT THE INVENTION

Described below is the first embodiment of the present invention with reference to FIGS. 1 to 17.

Figure 1:
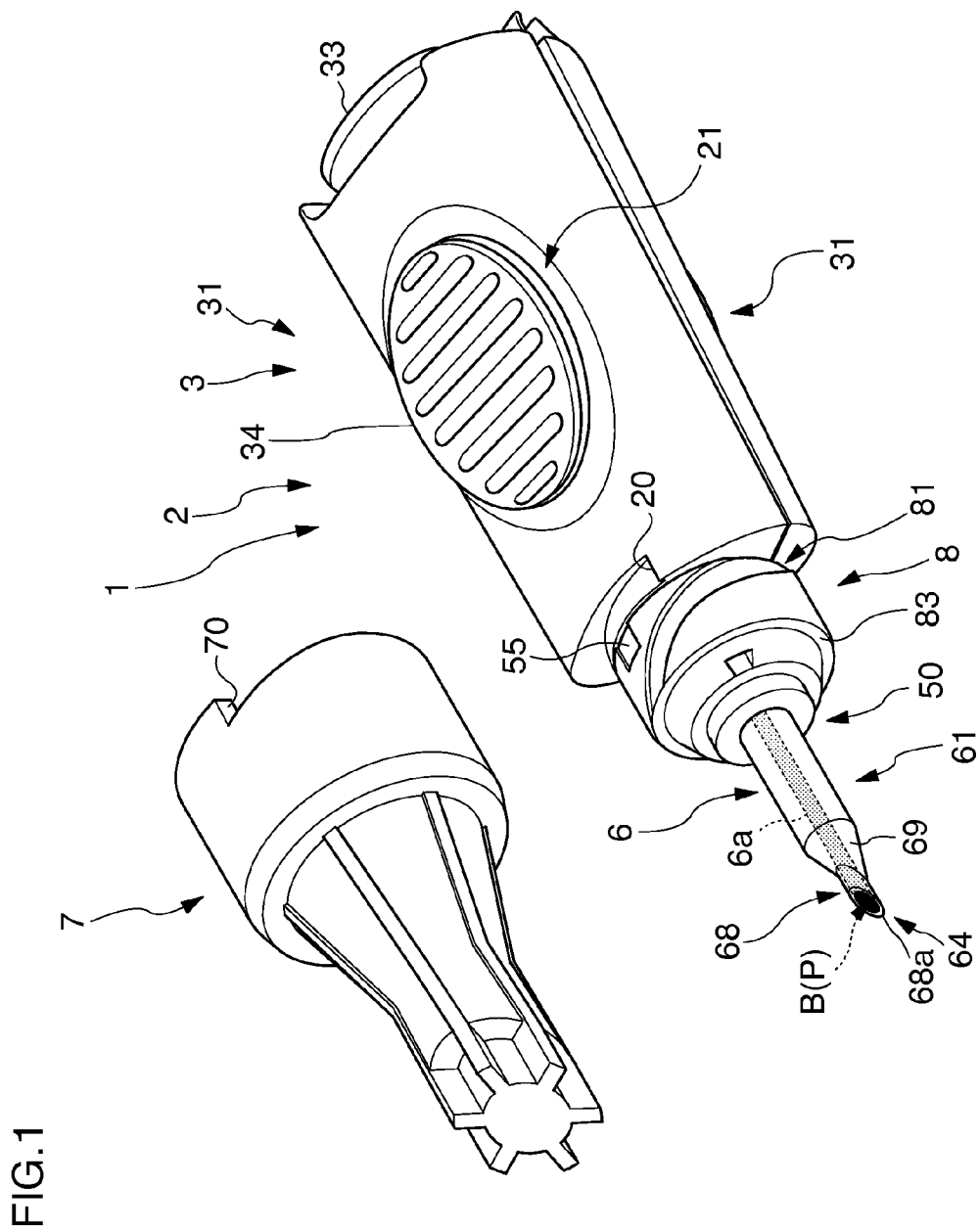
FIG. 1 is a perspective view of the first embodiment according to the present invention.
Figure 2:
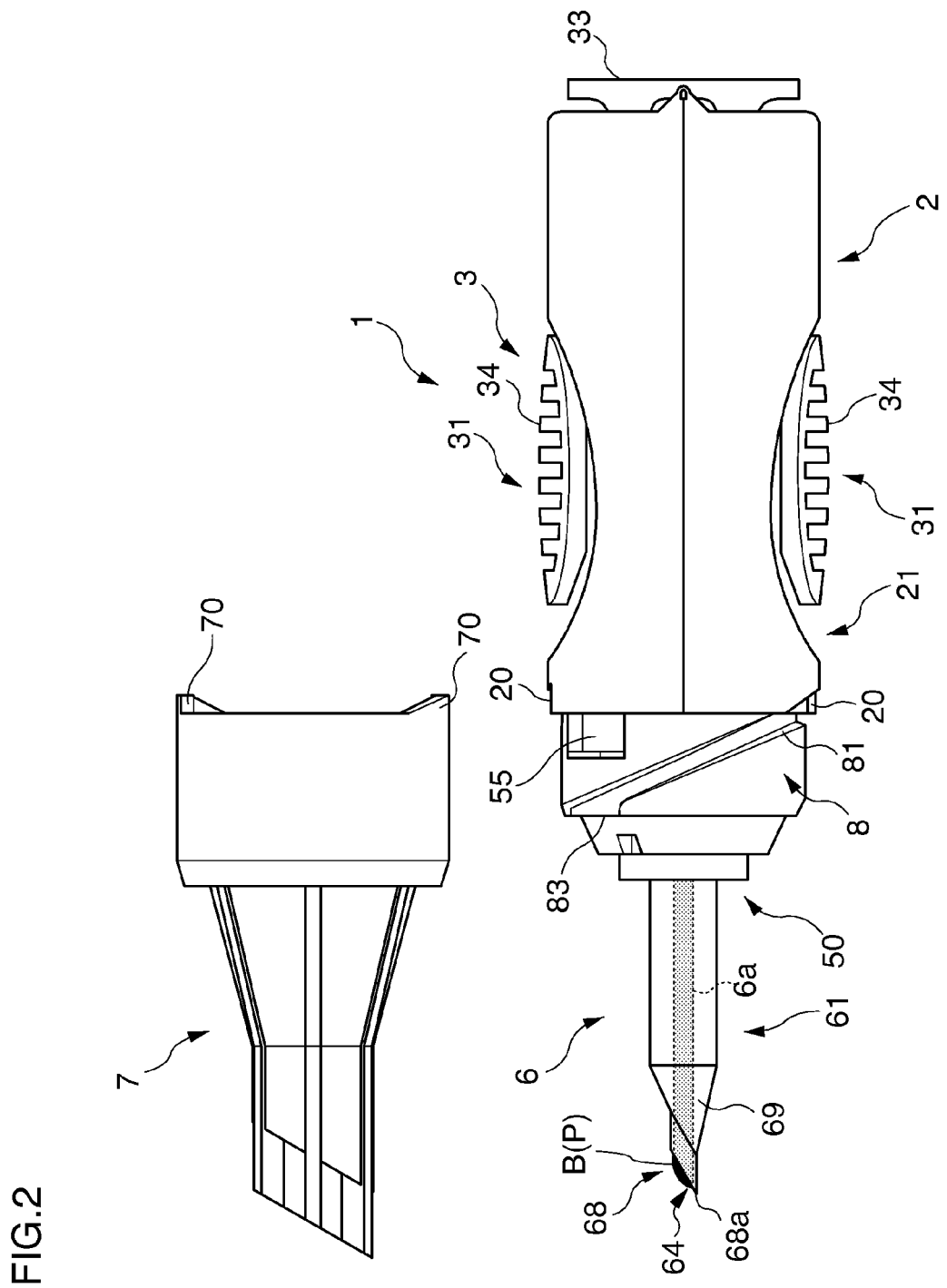
FIG. 2 is a front view of the first embodiment.
Figure 3:
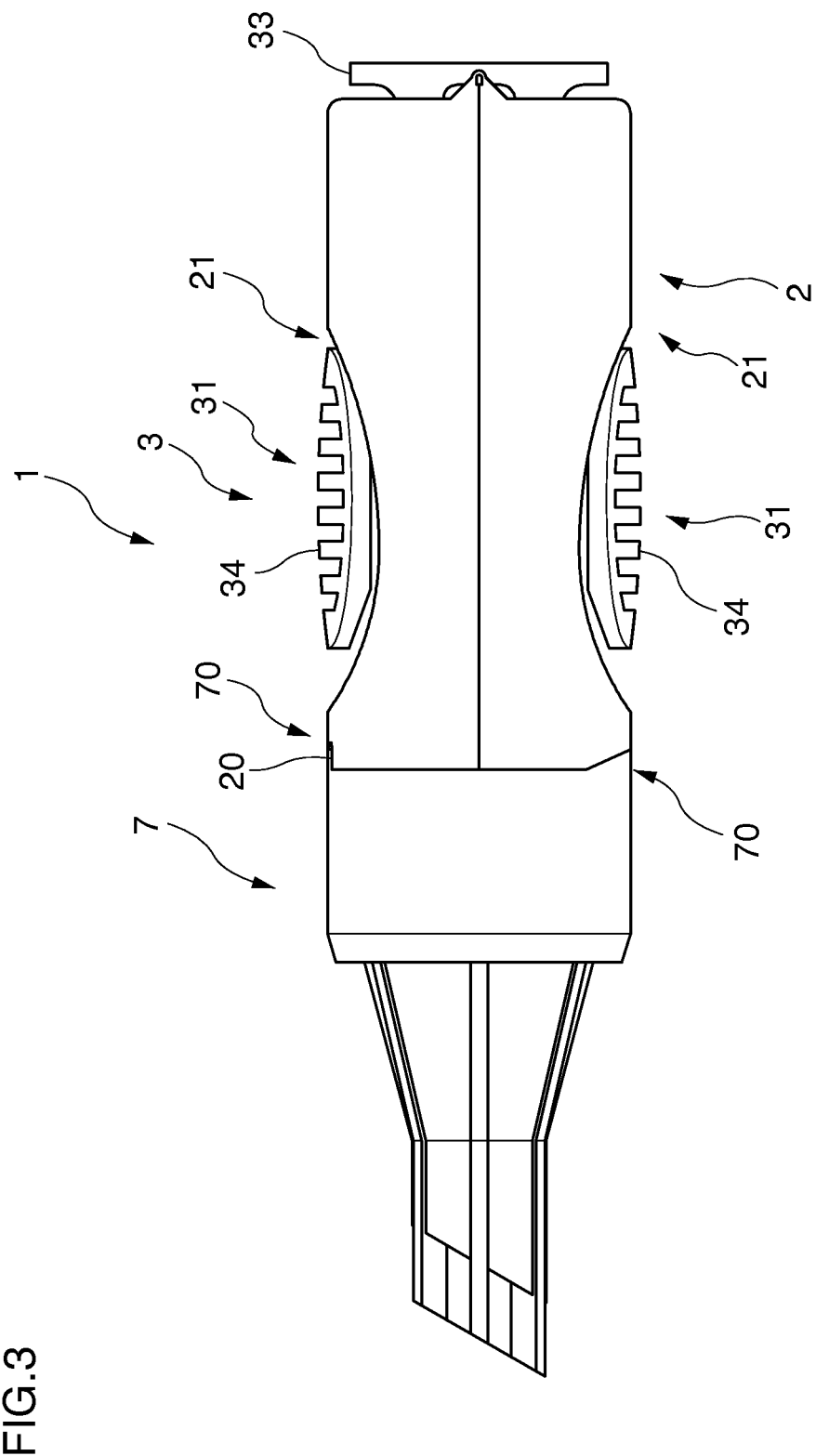
FIG. 3 is another front view of the first embodiment.

An applicator product according to the embodiment, which is able to apply adhesive B as an application material accurately, has the adhesive B, a container body 1 containing the adhesive B, a cap 7 as a light-shielding cap to be attached to and detachable from the container body 1, and a nozzle 6 as a see-through nozzle to be covered by the cap 7. The container body 1 contains the adhesive B in colored state (P) and shields the adhesive B from visible light. The container body 1 is such that the adhesive B put in a tube 9 accommodated in an accommodation portion 2 is pushed out toward the nozzle 6 as an application part by pressing a push button 3 mounted on the accommodation portion 2 with fingers and so on. The adhesive B pushed out is applied to an object via a top end face 68 of the nozzle 6. As shown in FIG. 3, this applicator product is in a state of avoiding contact of the adhesive B with air by sealing the top of the nozzle 6 by the cap 7 when not in use.

The adhesive B being the application material according to the embodiment will be described. The adhesive B is a liquid or gelatinous material to which a photochromic compound that develops a color by irradiation of ultraviolet light with a certain wavelength and is decolorized by irradiation of light under natural conditions is added. The adhesive B transits from the colored state (P) to decolorized state (Q) when it is irradiated with the light under natural conditions. The adhesive B is what is called an instant glue in general. The adhesive B contains the photochromic compound added thereto by, for example, 0.005 to 5.0 wt %, preferably 0.05 to 3.0 wt %, or further preferably 0.1 to 1.0 wt % in relation to the weight of a base substance to which the photochromic compound is added. The base substance is made up mainly of cyanoacrylate. That is, a method of producing the applicator product according to the present invention has a process of adding the photochromic compound to cyanoacrylate being the base substance.

In this embodiment, the photochromic compound is a diarylethene-based photochromic compound that develops a color when ultraviolet light having a wavelength of, for example, 365 nm is radiated thereon and becomes colorless when light under natural conditions is radiated thereon. Of course, the radiated ultraviolet light is only required to have a wavelength that makes it possible for the above photochromic compound or other photochromic compounds which may be utilized in the embodiment to exhibit color. In other words, the wavelength of such ultraviolet light is not limited to being 365 nm. Specifically, in this embodiment, 1,2-Bis (2-methylbenzo(b)thiophen-3-yl)hexafluorocyclopentene is used as an example of such diarylethene-based photochromic compounds. Of course however, an existing compound or of course a compound yet to be found is available as long as the photochromic compound is a diarylethene-based photochromic compound that satisfies the characteristics wherein the compound "exhibits a color when ultraviolet light is radiated thereon and becomes colorless when light under natural conditions is radiated thereon". Also, of course, the photochromic compound, apart from being a diarylethene-based compound, may be a spiropyran-based photochromic compound, and may even be a compound wherein these types of compounds are mixed together.

1,2-Bis(2-methylbenzo(b)thiophen-3-yl)hexafluorocyclopentene, which is a diarylethene-based photochromic compound, that configures the adhesive B according to the embodiment is a compound that displays values of 0.35, which are higher than with existing compounds, for both the reactive quantum yield displayed during ring-closure reaction when exhibiting color and the reactive quantum yield displayed during ring-opening reaction when becoming colorless. Especially in comparison to existing diarylethene-based photochromic compounds, properties are exhibited wherein the reactive quantum yield displayed during the ring-opening reaction due to irradiation of visible light is remarkably high. Due to this, even in cases when a light of natural conditions that for example with sunlight contains ultraviolet light by 5 to 6% is irradiated thereon, the ring-opening reaction proceeds in preference to become colorless. Thus of course, the adhesive B that contains said 1, 2-Bis (2-methylbenzo (b) thiophen-3-yl)hexafluorocyclopentene enters the decolorized state (Q) in accordance with this. However, depending on the season or location, it is possible that the balance of ultraviolet light and visible light contained in sunlight will change, and due to this balance, the adhesive B may slightly exhibit color. In addition, even after the decolorized state (Q) has once been reached, there may be cases where the adhesive B will be in a state of slightly exhibiting color. In such case, although not completely colorless, in comparison to the colored state (P) during transferring of the adhesive B, or in other words during application of the application material, this will be in a state that is rather close to being colorless. Such cases are matters that of course can be envisaged. Furthermore, the adhesive B according to the embodiment contains an ultraviolet absorber, for example, the ultraviolet absorber by about 10 wt % in addition to the photochromic compound described above. Due to this configuration, incases when the light under natural conditions is radiated thereon, as ultraviolet light contained in that light is absorbed by the ultraviolet absorber, it becomes further easier for the visible light to function in relation to the photochromic compound to quickly turn the compound into the decolorized state. As examples of the ultraviolet absorber, "SEESORB 101 (2-Hydroxy-4-methoxybenzophenone)", "SEESORB 102 (2-Hydroxy-4-n-octyloxybenzophenone)" and "SEESORB 701 (2-(2-Hydroxy-5-methylphenyl)benzotriazole)" that are products manufactured by SHIPRO KASEI KAISHA, LTD. can be cited.

Figure 4:
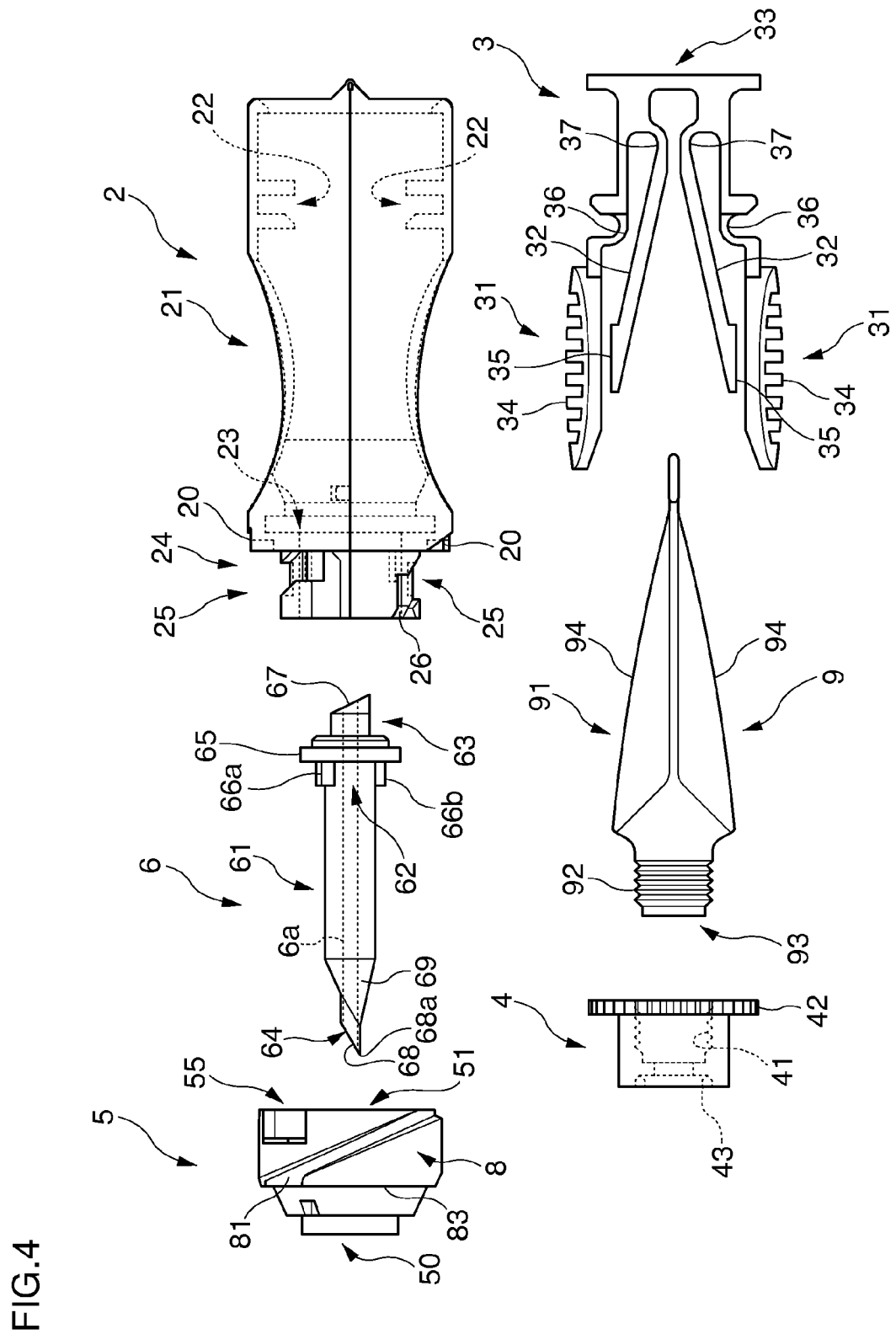
FIG. 4 is an exploded view of the first embodiment.

The adhesive B, prior to being accommodated in the tube 9 as a part of the container body 1, is brought in advance to the colored state (P) by being irradiated with ultraviolet light of a certain intensity having a wavelength of 365 nm for a certain length of time, In other words, the method of producing the applicator product has a process of radiating the ultraviolet light onto the adhesive B so as to bring the adhesive B into the colored state (P) in advance of being put into the tube 9 to be in a state as illustrated in FIG. 4.

As shown in FIG. 4, this container body 1 has the tube 9 mounted in the accommodation portion 2, an inner cap 34 attached to the tube 9, and a middle cap 5 externally fitted on the accommodation portion 2 in a manner of fixing the nozzle 6 as components thereof besides the accommodation portion 2 and the push button 3. The container body 1 is constructed by assembling these components properly.

The configuration of each part of the container body 1, the nozzle 6 and the cap 7 will be described seriatim.

The tube 9 has a tube body 91 that is made of, for example, an aluminum sheet molded into a film and is formed into a state of sealing and holding the adhesive B, an attachment screw part 92 that is formed into a male screw shape on one end side of the tube body 91, and an extracting face 93 that is composed of an aluminum material molded thin at one end side of the attachment screw part 92. The extracting face 93 enclosed by the attachment screw part 92 allows the adhesive B being extracted to the outside in a state of breaking the aluminum material. The configuration of the tube 9 is designed to hold, for example, existing adhesive B or medicine in gel state and such. That is, the tube 9 can be used as a container in itself. In this case, the application material, namely, the adhesive B is able to extracted to the outside of the tube 9 from the place where the aluminum material is broken of the extracting face 93 by pressing belly parts 94 with fingers and so on. Each of the belly parts 94 is flatly formed on the periphery of the tube body 91 so as to constitute the front and rear surface respectively.

The accommodation portion 2 is integrally formed of, for example, resin. The accommodation portion 2 has what is called a half-cut structure including two parts which are formed symmetrically via a resin hinge arranged on the base end side of the accommodation portion 2 being the opposite side to the top end thereof where the nozzle 6 is placed. In other words, the accommodation portion 2 holds the other components to be accommodated therebetween with the resin hinge. This accommodation portion 2 has button holes 21 opened in the position which is the center of width and the center of length thereof and being capable of exposing the push button 3, button mounting parts 22 which are grooves for holding the push button 3 on the inner side in the vicinity of the base end of the accommodation portion 2, an inner cap mounting part 23 which is a groove for holding the inner cap 4 on the inner side in the vicinity of the top end of the accommodation portion 2, and a middle cap mounting part 24 on which the middle cap 5 can be externally fitted. And, this middle cap mounting part 24 includes an engagement guide part 25 described below, removal guide parts 201 to remove the middle cap 5 when segregation and disposal, and removal lead parts 202 for leading to the said removal guide parts. Each of the removal guide parts 201 is a groove extending along the lengthwise direction of the middle cap mounting part 24 provided near the engagement guide part 25. Each of the removal lead parts 202 is a round surface configured by forming the periphery between the engagement guide part 25 and the removal guide part 201 into a curved shape.

The push button 3 is integrally formed of, for example, elastic resin into a symmetrical shape. The push button 3 has button bodies 31 to be pushed directly by an user, pressing plates 32 that can press both of the belly parts 94 of the tube body 91, which is specifically formed into planar shape, with a uniform pressure while being pushed by the button bodies 31, and a base end part 33 that supports a pair of the button bodies 31 and the pressing plates 32 movably through elasticity of the resin and is exposed on the base end side of the accommodation portion 2. Concretely explaining, Each of the button bodies 31 includes an operation part 34 on which a convex-concave shape with a plurality of ribs arranged at equal intervals is formed for being easily pinched with fingers and such without slipping and a thin hinge part 36 which is formed to curve on the base end side of the operation part 34. Each of the pressing plates 32 includes a transmitting rib 35 and a nipping hinge 37. Each of the transmitting ribs 35 is extended in the mutually opposite directions at the fore part thereof, and the forefront of the transmitting rib 35 is able to touch the button body 31. The nipping hinges 37 hold the other end of the tube 9 and are able to bend in preference because of their thinness.

Figure 5:
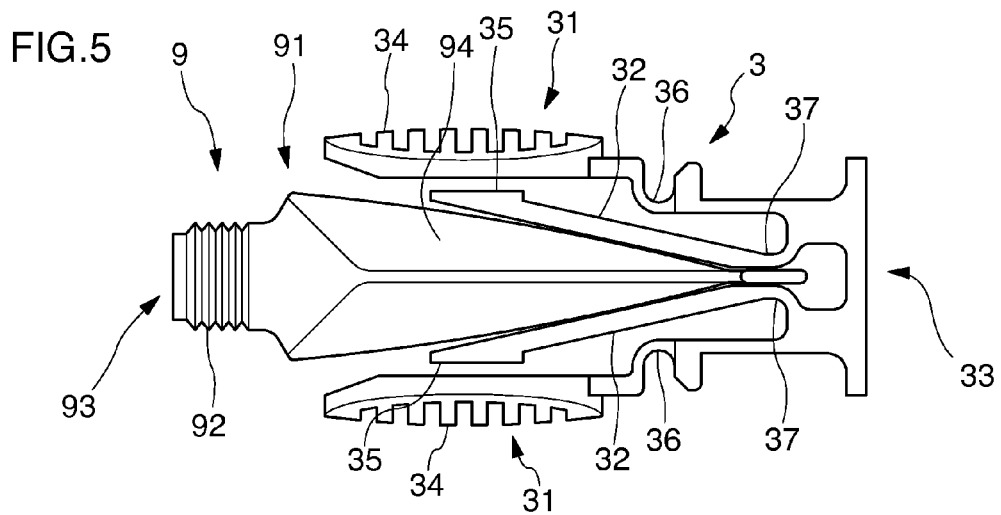
FIG. 5 is an explanatory diagram showing the action of a part of the first embodiment.
Figure 6:
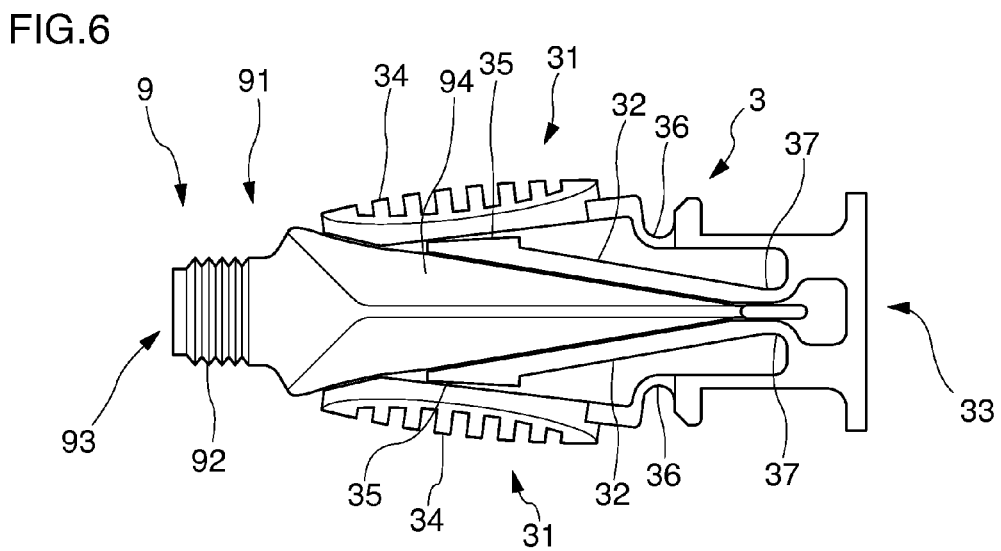
FIG. 6 is the same as above.
Figure 7:
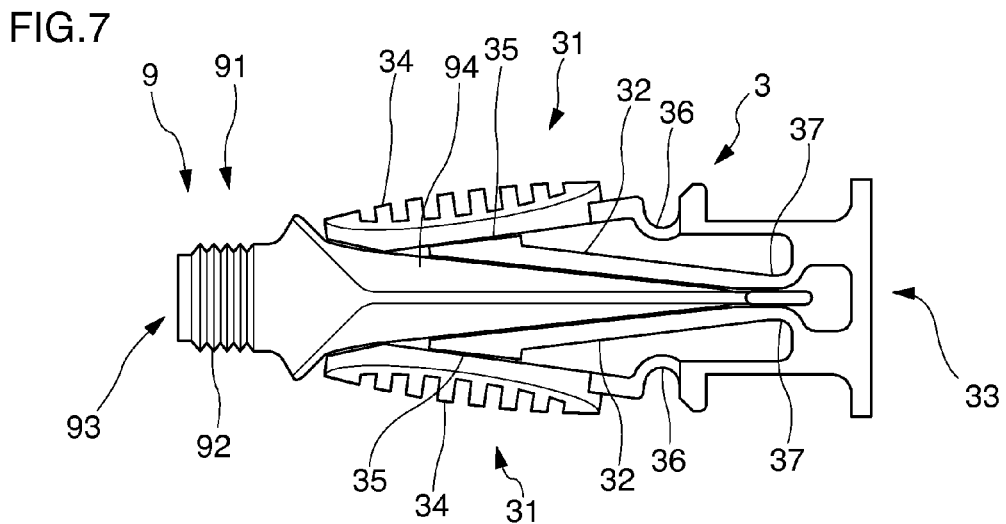
FIG. 7 is the same as above.

As shown in FIGS. 5 to 7, the push button 3 has a pair of the button bodies 31 to be mounted on the accommodation portion 2 accommodating the tube 9 and a pair of the pressing plates 32 to be pushed by pushing the button bodies 31. The pressing plates 32 come into close contact with the belly parts 94 and pinch the tube 9. While the pressing plate 32 presses the belly part 94, the pressing area thereof is gradually expanded from the other end side which is the opposite side to the extracting face 93 to one end side which is the extracting face 93 side. In this way, as shown in FIG. 6, the tube 9 is pressed from the other end side to the one end side in a manner of expanding the pressing area gradually even though the user push a local point on the operation part 34. Therefore the adhesive B being the contents of the tube 9 is stably extracted without waste. Especially in this embodiment, the contact position on which the button body 31 is brought into contact with the transfer rib 35 provided on the pressure plate 32 is moving slightly from the other end side to the one end side during pressing movement. This makes it possible to press the tube 9 in a planar manner and extract the adhesive B surely from the tube 9 in which small amount of the adhesive B remains as illustrated in FIG. 7.

The inner cap 4 is intended to fix the tube 9 to the inside of the accommodation portion 2. The inner cap 4 has an internal thread part 41 to be engaged with the attachment screw part 92 of the tube 9, a mounted flange 42 to be inserted in the inner cap mounting part 23 of the accommodation portion 2, and a nozzle abutting part 43 to abut the nozzle 6 and position the nozzle 6 in the longitudinal direction. In the embodiment, projections and recesses are formed on the outer peripheral surface of the mounted flange 42 so that the operation for screwing the inner cap 4 to the tube 9 is smoothly executed. Being accommodated in the inner cap mounting part 23, the projections and recesses of the outer peripheral surface are engaged with projections (not shown in Figs.) formed on the inner face of the inner cap mounting part 23 so as to inhibit relative rotation when mounting.

The middle cap 5 is provided with a drip preventive part 50 on the distal end portion and can effectively avoid a problem that the adhesive B which spills from the nozzle 6 would drip. Knurls 5a (see FIG. 11) are formed on a part of the surface of the middle cap 5. The middle cap 5 has an outer fitting part 51 that is able to cover the inner cap mounting part 23 of the accommodation portion 2 from outside, a screw portion 8 that is screwed to the cap 7 with a first screw groove 81 and a second screw groove 82 formed on the outer surface thereof as described later, a nozzle fitting portion 53 having positioning grooves 57 to fix the nozzle 6 in the axial direction, and an opening part (not shown in Figs.) that is opened in a part of the outer fitting portion 51. In the embodiment, the outer fitting portion 51 has rotating engagement pawls 55 that can be engaged with the middle cap mounting part 24 toward inside. Each of the rotating engagement pawls 55 has an extension part 58 formed by cutting a resin material appropriately that is extended along the circumferential direction, and a engaging end 59 protruding inwardly at the tip of the extension part 58 to be engaged with the middle cap mounting part 24 directly.

And, the screw portion 8 has the first screw groove 81 that is a single thread groove provided on the surface of the middle cap 5, the second screw groove 82 that is formed deeper and larger in width than the first screw groove 81, a step part 83 provided in a part including the start part of the first screw groove 81 other than the start part of the second screw groove 82 on the periphery of the middle cap 5, and a climbed bump 84 that is a bump provided near the end of the second screw groove 82. The second screw groove 82 is a single groove formed at a position which is separated from the first screw groove 81 by 180 degrees in the circumferential direction. The climbed bump 84 provided near the end of the second screw groove 82 gives the user click feeling and inform the user that a second projection (not shown in Figs.) on the cap 7 comes to the end of movement when the second projection climbs over the climbed bump 84. The step part 83 is a portion formed around the start part of the first screw groove 81 with an outer diameter that is larger by the difference between the depth of the first screw groove 81 and the depth of the second screw groove 82. Screwing the cap 7 relatively with the screw part 8 is inhibited when the second projection abuts the step part 83.

The nozzle 6 as the see-through nozzle according to the embodiment has a top portion 64 protruding from the container body 1 to apply the adhesive B onto the object, and a see-through passage 6a that guides the adhesive B from the container body 1 toward the top portion 64. At least a part of the see-through passage 6a including the top portion 64 is translucent so that the adhesive B is visible from outside.

Figure 8:
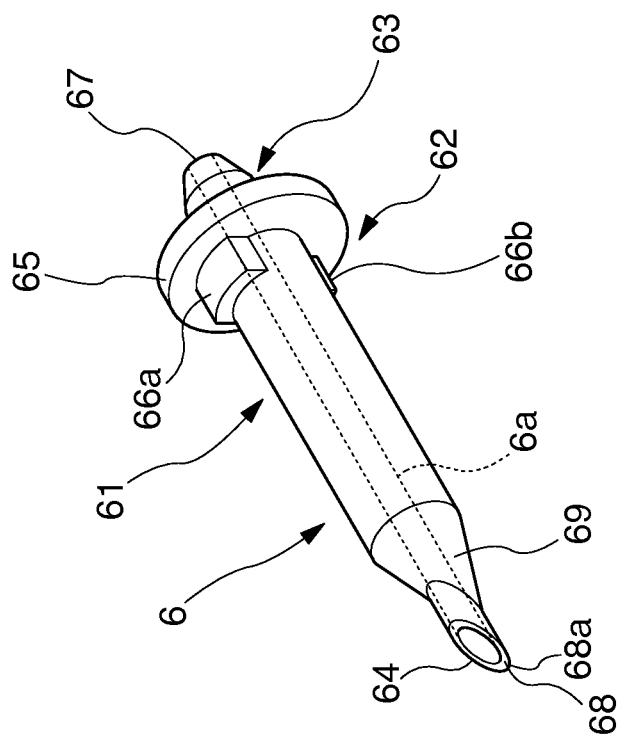
FIG. 8 is a perspective view of a part of the first embodiment.

Specifically, as shown in FIG. 8, the nozzle 6 is integrally molded of translucent resin to facilitate recognizing whether the adhesive B remains or not. Even though the translucent nozzle 6 is made of polyethylene in the embodiment, of course the nozzle 6 may be approximately transparent made of another material such as acrylic. The nozzle 6 has a nozzle body 61 exposed out of the accommodation portion 2, a fitted part 62 to be attached to middle cap 5, and an extraction pipe 63 nearer to the bottom end than the fitted part 62 to extract the adhesive B. The nozzle body 61 includes the top portion 64 having the top end face 68 that is formed by cutting the top end side of the top portion 64 obliquely against the axis and a taper part 69 that is tapered to decrease the diameter toward the top portion. The fitted part 62 has a flange 65 that is positioned in the longitudinal direction by the middle cap 5, and the large and small positioning ribs 66a and 66b, the two positioning ribs 66a and 66b protrude to determine the relative angle to the middle cap 5 and prohibit the rotation about the axis. Here, the top portion 64 of the nozzle 6 has the top end face 68 formed by cutting the nozzle body 61 along an oblique direction. This top end face 68 constitutes a cross section being a slanted plane and a keenly sharp edge 68a on the top thereof. Therefore the tip shape of the nozzle 6 can vary area in contact with the object thorough varying orientation of the nozzle 6 relative to the object. Thereby, application width of the adhesive can be freely changed. That is, the shape of the nozzle 6 has directionality. The thickness of the material that constitutes the top portion 64 of the nozzle 6 is preferably set to 0.3 mm or less, but it may be less than or equal to 0.5 mm.

On the other hand, the cap 7 as the light-shielding cap is detachably mounted on the container body 1 to shield the adhesive B as the application material in the see-through passage 6a from visible light. As shown in FIGS. 1 to 3 and 19 to 21, it is screwed to the container body 1 in a manner of covering the top end side of the container body 1 so as to cover the nozzle 6. The cap 7 is integrally molded of, for example, resin. The cap 7 has a first projection 71 and the second projection (not shown in Figs.) that are formed with protruding the resin on the inner face, positioning parts 70 that are formed into a step-like shape on the bottom end side edge, rubbing ribs 73 that are provided inside the cap 7 and extend along the longitudinal direction in the vicinity of the top of the cap 7 so that rubbing ribs 73 are able to be rubbed against the outer face of the nozzle 6, a protrusion 74 that is formed into a cylindrical shape protruding from the inner face on the top end part of the cap 7 toward the bottom end side, and an inclined rising area 75 where the protrusion 74 rises up on. The number of rubbing ribs 73 is, for example, four. The protrusion 74 is able to be inserted into the nozzle 6.

The first projection 71 is a projection having an approximately rectangular shape that is in correspondence to the depth and width dimensions of the first screw groove 81 described above. The second projection (not shown in Figs.), which is formed at a position facing the first projection 71, is a projection having a rectangular shape that is in correspondence to the depth and width dimensions of the second screw groove 82 described above. That is, the second projection has greater in protruding size and area than the first projection 71 and can be put in the second screw groove 82 without backlash. The positioning parts 70 can effectively retain an end position by coming into contact with the container body 1 at the end position. The positioning parts 70 abut not the middle cap 7 but cap stopper parts 20 provided in the accommodation portion 2 of the container body 1. Hence, even if the user screws the cap 7 back on with strong force, the acting force will not affect the middle cap 5. The four rubbing ribs 73 are ribs provided at equal intervals along the circumferential direction. Tips of the rubbing ribs 73, which are formed to incline according to the angle of the taper part 69 of the nozzle 6, rub against the taper part 69 until the end position while screwed so as to peel off the adhesive B adhering to the taper part 69. The protrusion 74 is inserted into the top portion without backlash at the end position so as to preventing the adhesive B in the nozzle 6 from touching the air and being cured. And, the protrusion 74 has a slanted top end 74a on its top end part inside the cap 7. The slanted top end 74a is formed so as to face a slanted direction relative to the axis, in other words, the forward and backward direction along which the cap 7 moves while screwed. The slanted top end 74a makes it difficult for the protrusion 74 to interfere with the shape of the top portion 64 of the nozzle 6.

Figure 9:
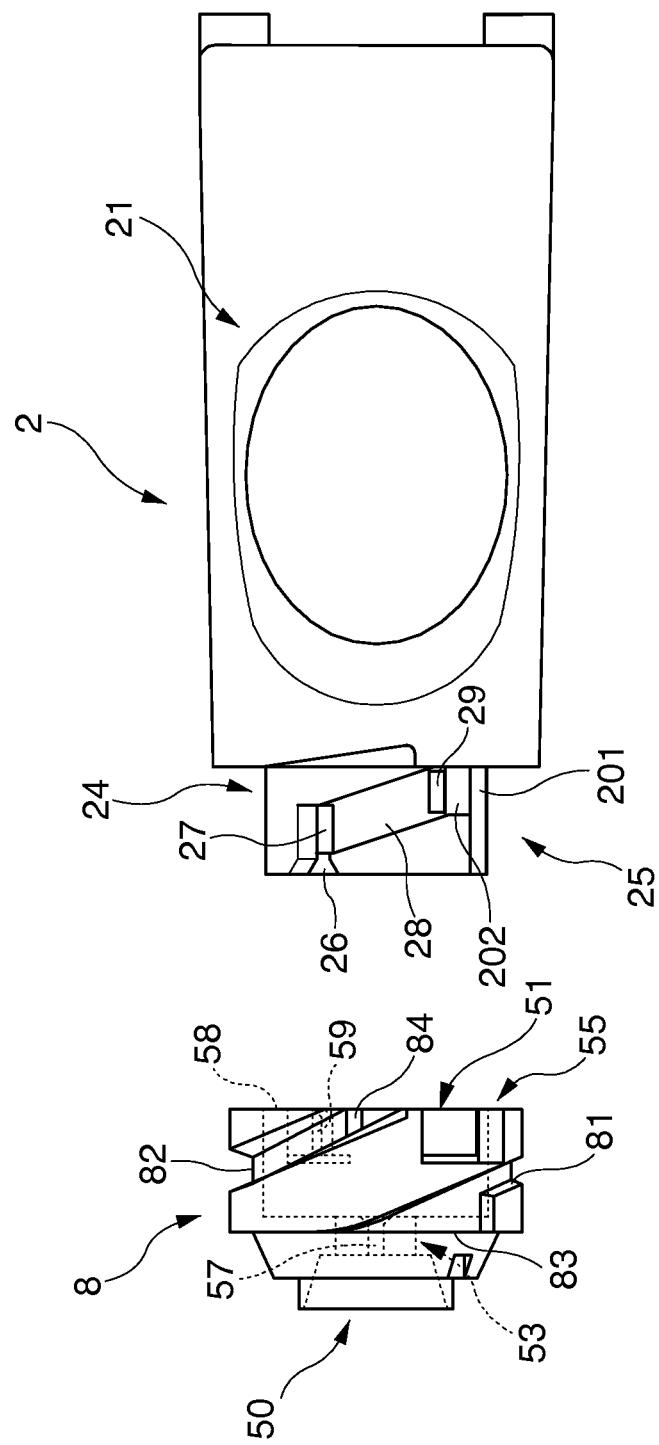
FIG. 9 is a plan view of a part of the first embodiment.

The container body 1 in the present embodiment has the engagement guide part 25, the removal guide parts 201 and the removal lead parts 202. The engagement guide part 25, especially as shown in FIG. 9, is capable of engaging the accommodation portion 2 with the nozzle 6 at a first engagement position and a second engagement position. At the first engagement position, the nozzle 6 is engaged with the accommodation portion 2 in a state that the nozzle 6 and the middle cap 5 cannot apply the adhesive B. At the second engagement position where the nozzle 6 is displaced from the first engagement position relatively with the accommodation portion 2, the nozzle 6 is engaged with the accommodation portion 2 in a state that the nozzle 6 cannot move relatively with the accommodation portion 2 and can apply the adhesive B. The engagement guide part 25 guides the nozzle 6 from the first engagement position to the second engagement position. The removal guide parts 201 are capable of disengaging the nozzle 6 and the middle cap 5 from the accommodation portion 2. The removal lead parts 202 guide movement from the second engagement position to the removal guide parts 201.

The engagement guide part 25 is provided on the middle cap mounting part 24 in the accommodation portion 2 in the embodiment. The engagement guide part 25 is engaged with the rotating engagement pawls 55 that are provided on the middle cap 5 having the nozzle fitting part 53 where the nozzle 6 is fixed without rotating to. And, the engagement guide part 25 guides the rotating engagement pawls 55 so that the engagement guide part 25 indirectly positions the nozzle 6 into the first engagement position or the second engagement position. The engagement guide part 25, especially as shown in FIG. 9, has introducing grooves 26 where the engaging ends 59 is put in, first engaging holes 27 to position the nozzle 6 indirectly at the first engagement position, rotation guide grooves 28 that are grooves being continuous from the first engaging holes 27 along a screw direction, and second engaging holes 29 to fix the nozzle 6 indirectly to the second engagement position with immovable positioning of the engaging ends 59 guided by the rotation guide grooves 28.

A series of operations to guide the nozzle 6 from the first engagement position to the second engagement position and direct the nozzle 6 toward a suitable direction for use so that the container body 1 is ready for use will be described with reference to FIGS. 10 to 14, and also another operation to remove the nozzle 6 as well as the middle cap 5 from the accommodation portion 2 for separate disposal of the tube 9 and so on will be described with reference to FIGS. 10 to 14.

Figure 10:
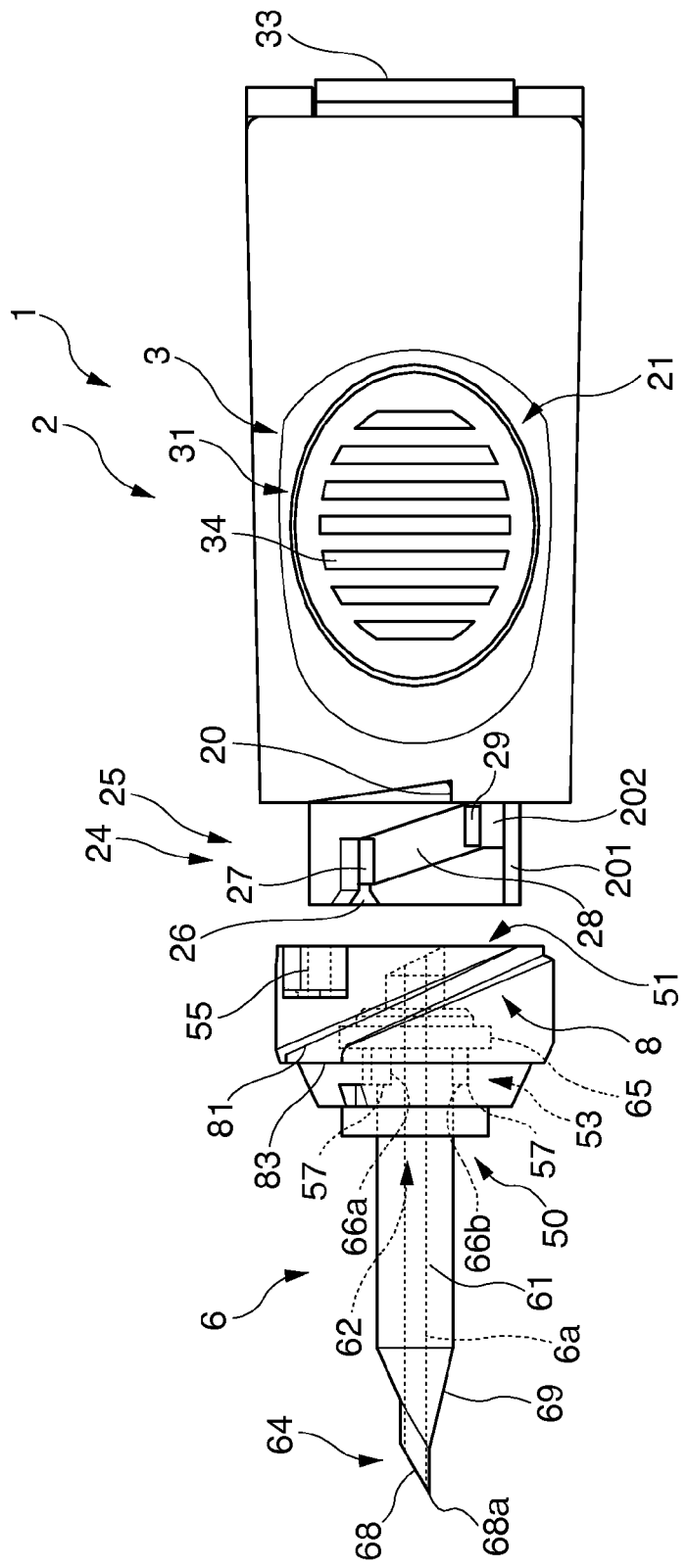
FIG. 10 is an explanatory diagram showing the action of the first embodiment.
Figure 11:
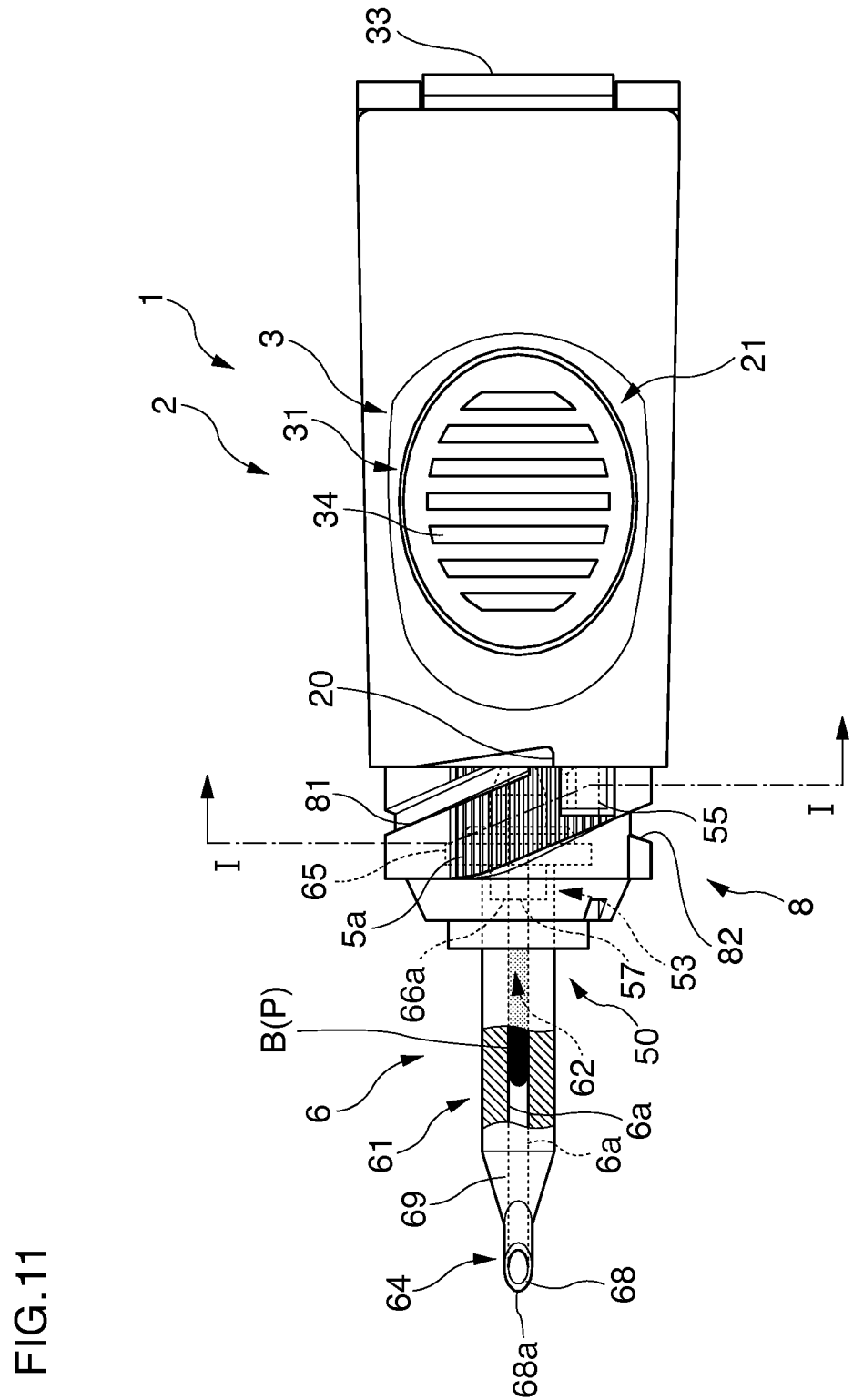
FIG. 11 is the same as above.
Figure 12:
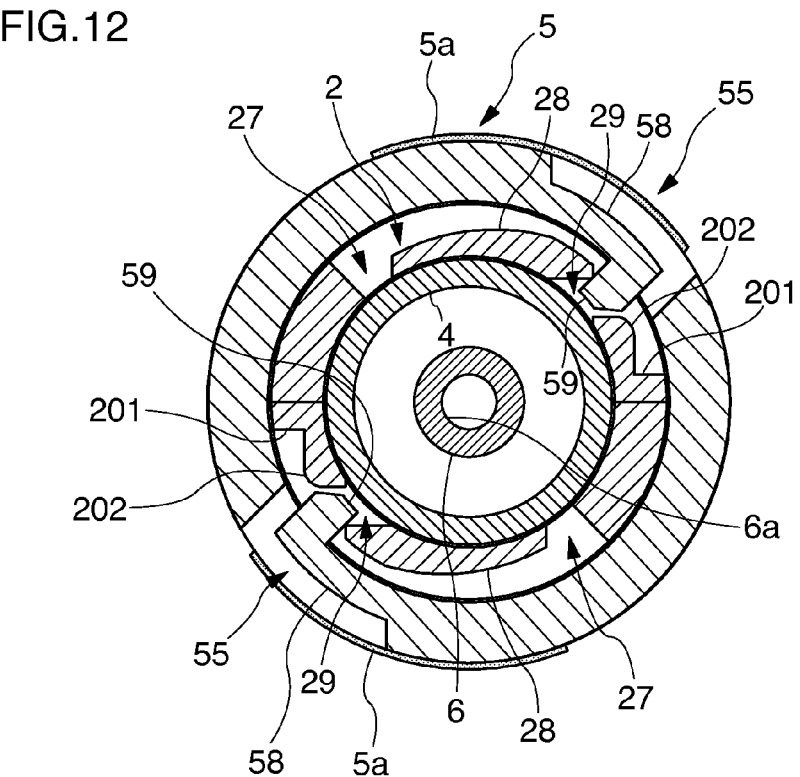
FIG. 12 is a cross-sectional view taken along the line I-I in FIG. 11.
Figure 13:
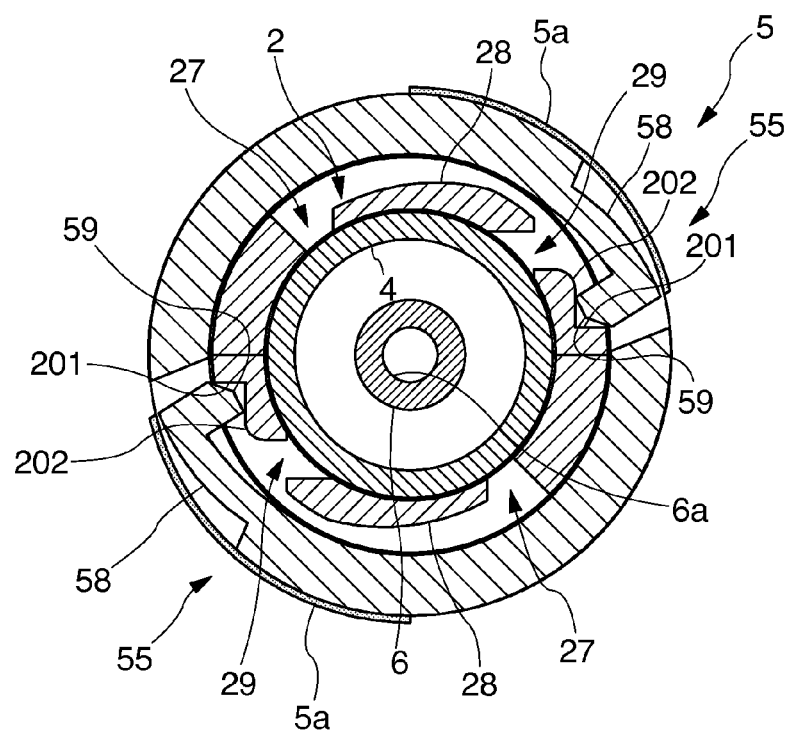
FIG. 13 is an explanatory diagram showing the movement corresponding to FIG. 12.

First, FIG. 10 shows a state before mounting the middle cap 5 to which the nozzle 6 is fixed on the accommodation portion 2. In reality, such operation is performed while the middle cap 5 is put in the cap 7. Specifically, the engaging ends 59 of the rotating engagement pawls 55 in the middle cap 5 are matched with the positions at which the engaging ends 59 are able to be put into the introducing grooves 26. Next, the engaging ends 59 are operated further from this state toward the bottom end side along the introducing grooves 26, each of the engaging ends 59 is engaged with each of the engaging holes 27 at the first engagement position. At this first engagement position, the adhesive B cannot be injected into the nozzle 6 because the bottom end of the nozzle 6, i.e. a piercing tip 67 of the extraction pipe 63 is separated from the extracting face 93 of the tube 9. Then, the middle cap 5 is screwed such that the engaging ends 59 are rotated along the rotation guide grooves 28, the piercing tip 67 is rotated piercing the extraction surface 93 and is inserted into the tube 9. In this embodiment, as shown in FIG. 11, each of the engaging ends 59 is introduced into each of the second engaging holes 29 when screwed by 90 degrees from the first engagement position. At this time, the engagement ends 59 are fitted deeply into the second engaging holes 29, therefore the engagement is no longer released unless an external force much greater than normal operating force is applied. The series of the operations up to here is carried out through the cap 7 as described above. Thereby, in the state of fitting the engaging ends 59 to the second engaging holes 29, each of the positioning parts 70 of the cap comes into contact with each of the cap stopper parts 20 of the accommodation portion, further rotation thereof is inhibited. And, in the state illustrated in the same Figure, the nozzle 6 is indirectly fixed to the accommodation portion 2 at the second engagement position, because the rotation of the nozzle 6 is inhibited by the positioning ribs 66 fitted into the positioning grooves 57 and besides the movement along the extending direction of the nozzle 6 is inhibited by the flange 65 abutting the nozzle abutting part 43.

At the second engagement position, the top end face 68 of the nozzle 6 faces the same side as a side on which the button body 31 of the push button 3 mounted on the accommodation portion 2 appears. That is, the direction in which the operating part 34 is exposed is consistent with the direction in which the top end face 68 of the nozzle 6 faces. Therefore the direction in which the belly part 94 of the tube body 91 and the operating part 34 face is consistent with the direction in which the top end face 68 of the nozzle 6 faces. Hence, pressing operation against the tube 9 and viewing of discharge of the adhesive B from the top end face 68 are facilitated. Thus, the user can easily recognize the orientation of the top end face 68 from the direction of pressing the button body 31.

In this embodiment, a removable structure in which the middle cap 5 can be removed from the accommodation portion 2 is employed. That is, it is possible to remove the middle cap 5 from the accommodation portion 2 by rotating the middle cap 5 further from the second engagement position. This operation is executed not through the cap 7, but by picking the knurls 5a provided on the middle cap 5 with fingers and so on. Such a removable structure is not limited for the removal of the middle cap 5 from the accommodation portion 2 and is applicable to other.

That is, the removal guide parts 201 and the removal lead parts 202 are provided according to the embodiment. Each of the removal guide parts 201 is formed in the accommodation portion 2 being a left element so that the middle cap 5 being a removal element can be removed from the accommodation portion 2 by rotating the middle cap 5 further from the second engagement position as an engagement position. Each of the removal lead parts 201 leads to the removal guide part 201 from the engagement position. Specifically, rotating the middle cap 5 further from the second engagement position illustrated in FIGS. 11 and 12 with picking the knurls 5a provided on the surface of the middle cap 5 and so on results in the state illustrated in FIG. 13. In this state, the engaging ends 59 escape from the second engaging holes 29 and is led by the removal lead parts 202 so that the engaging ends 59 take removable position where the engaging ends 59 approximately touch the groove-like removal guide parts 201 that extend to the top of the middle cap mounting part 24.

Figure 14:
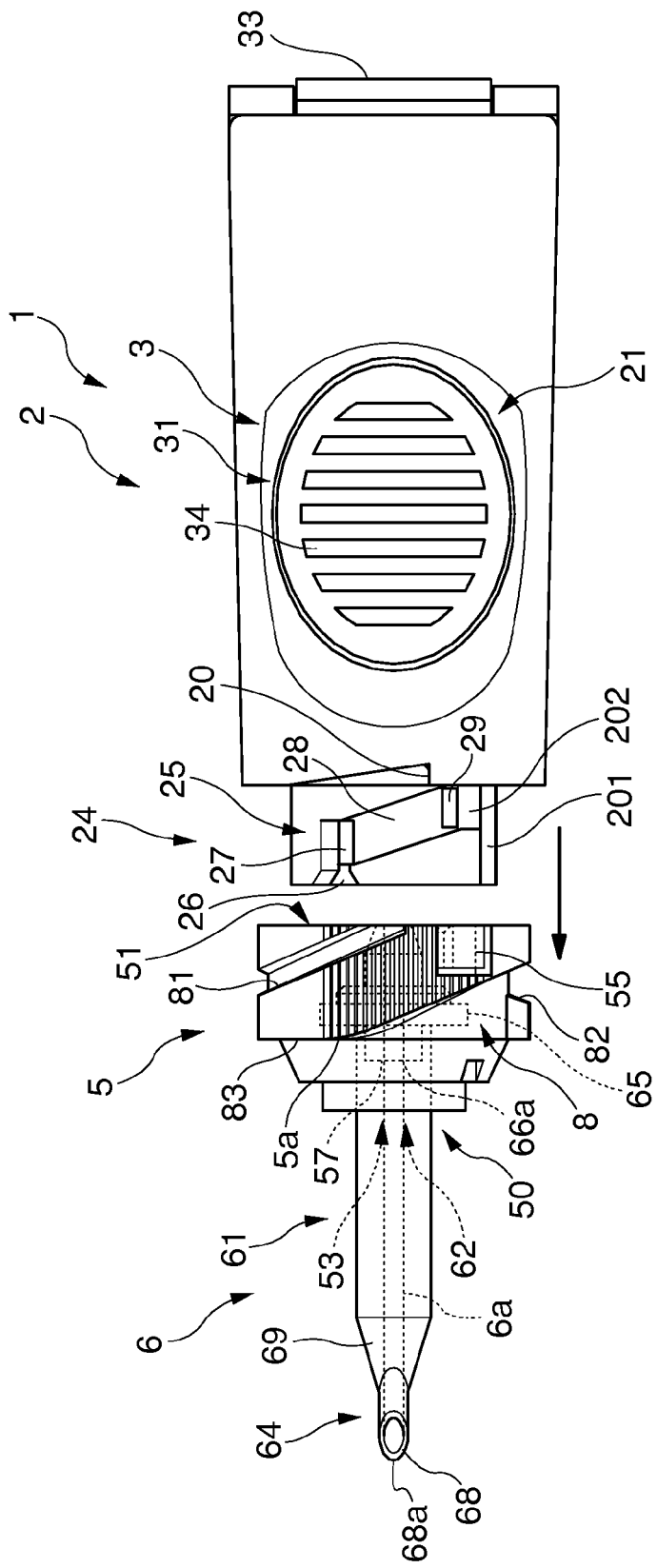
FIG. 14 is an explanatory diagram showing the action of the first embodiment.

After that, as shown in FIG. 14, the middle cap 5 is able to be removed from the accommodation portion 2 by pulling the middle cap 5 whose engaging ends 59 touch the removal guide parts 201 that are formed into a groove shape with a small force. Also, the exhausted tube 9 will be picked up from the accommodation portion 2 that the middle cap 5 is removed. Thereby, the aluminum tube 9 is able to be disposed separately from the other components made of resin. The above described removable structure constituted of the middle cap 5 as the removal element and the accommodation portion 2 as the left element can be employed as structures of various other assembled products.

According to this embodiment, since the see-through passage 6a provided in at least a part including the top portion 64 to guide the adhesive B from the container body 1 to the top portion 64 is configured to be translucent so that the adhesive B is visible from the outside, the user can apply desired amount of the adhesive B to desired place and desired area on the object.

A manner of applying the adhesive B to the object with the applicator product according to this embodiment will be described with reference to FIGS. 15 to 18.

Figure 15:
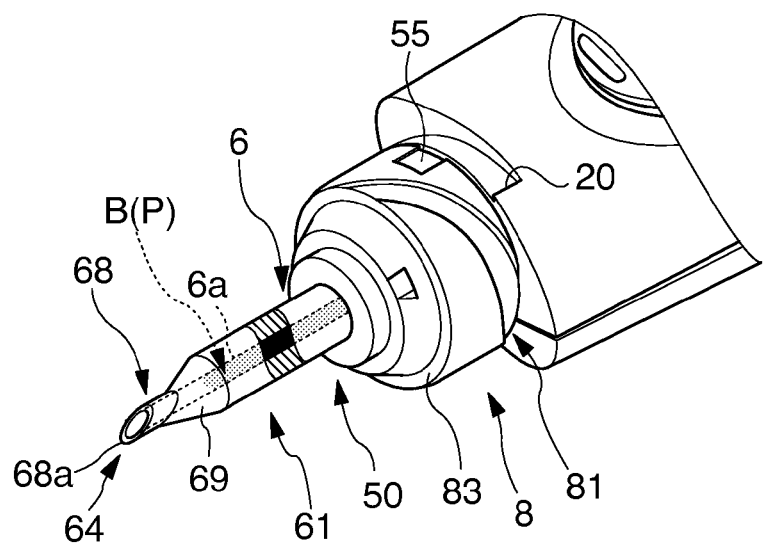
FIG. 15 is an explanatory diagram showing the action of the first embodiment.
Figure 16:
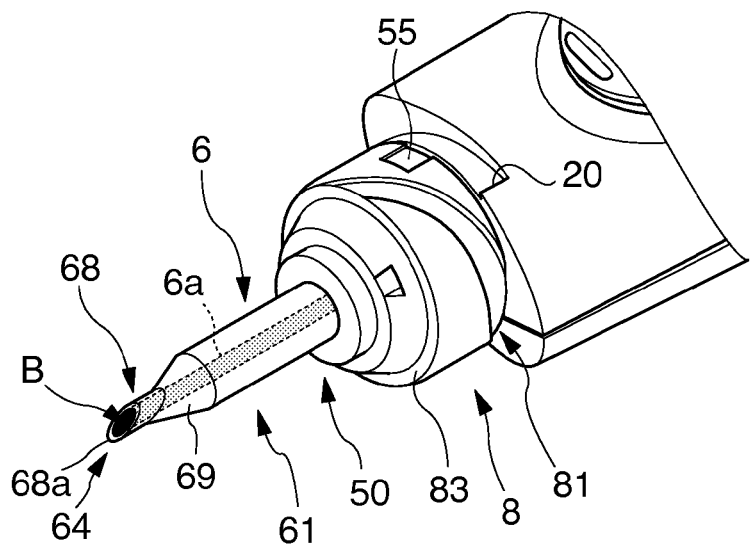
FIG. 16 is the same as above.
Figure 17:
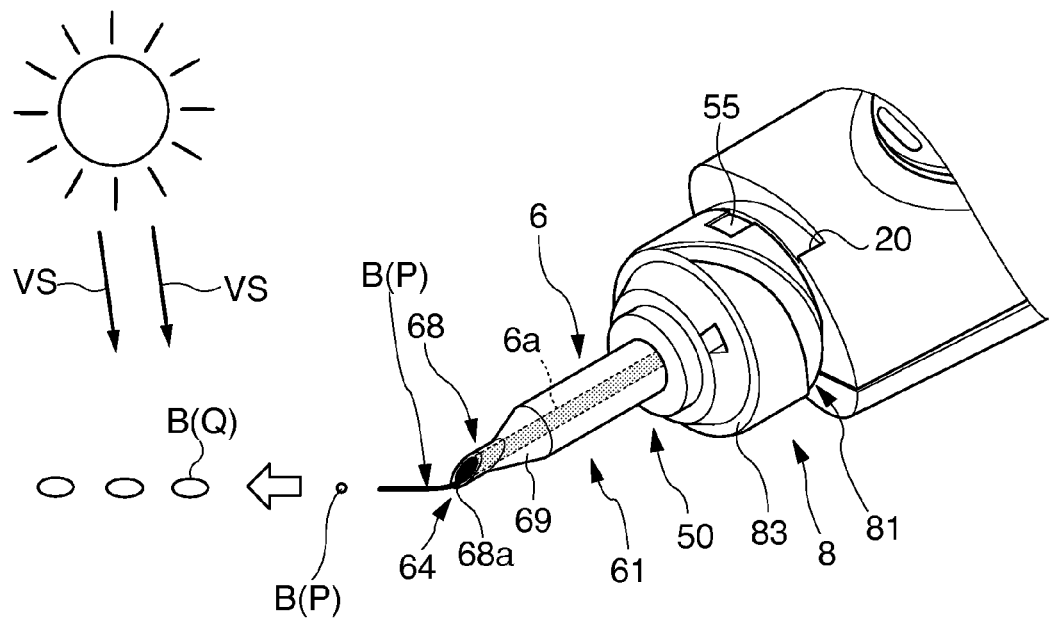
FIG. 17 is the same as above.
Figure 18:
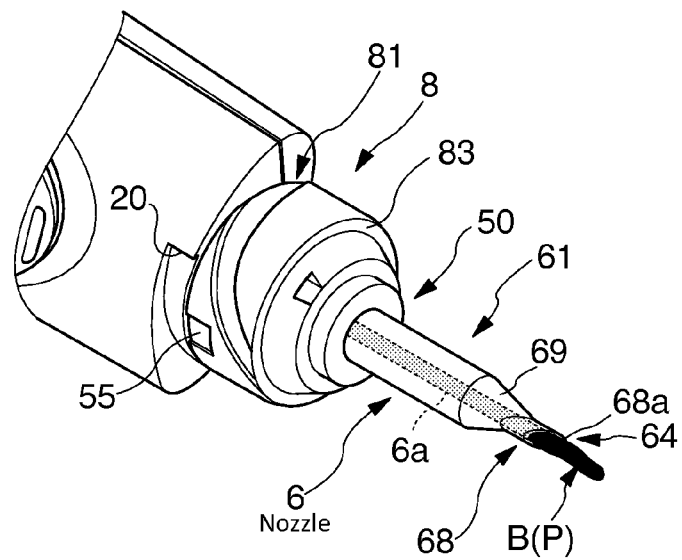
FIG. 18 is the same as above.
Figure 21:
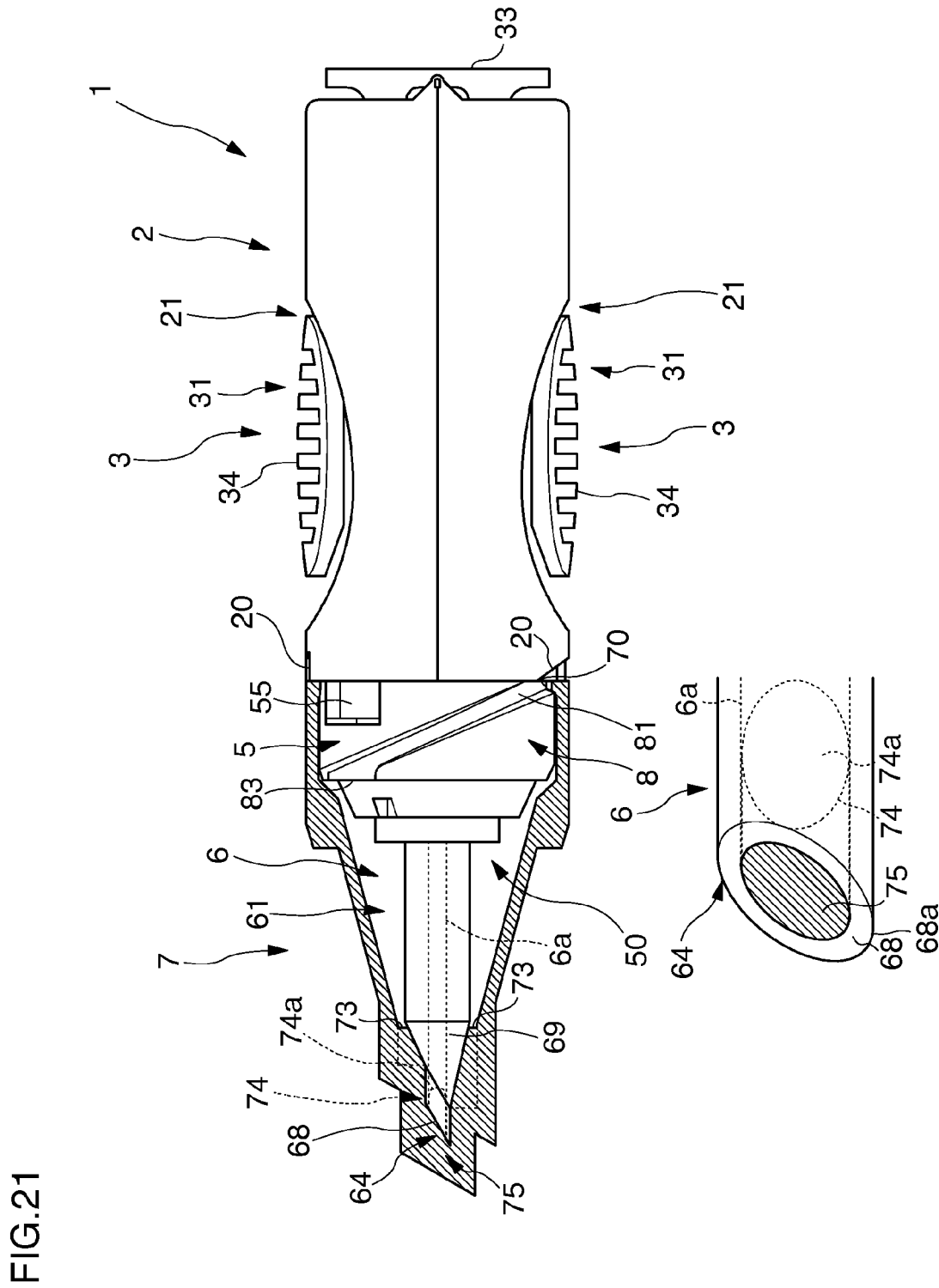
FIG. 21 is the same as above.
Figure 22:
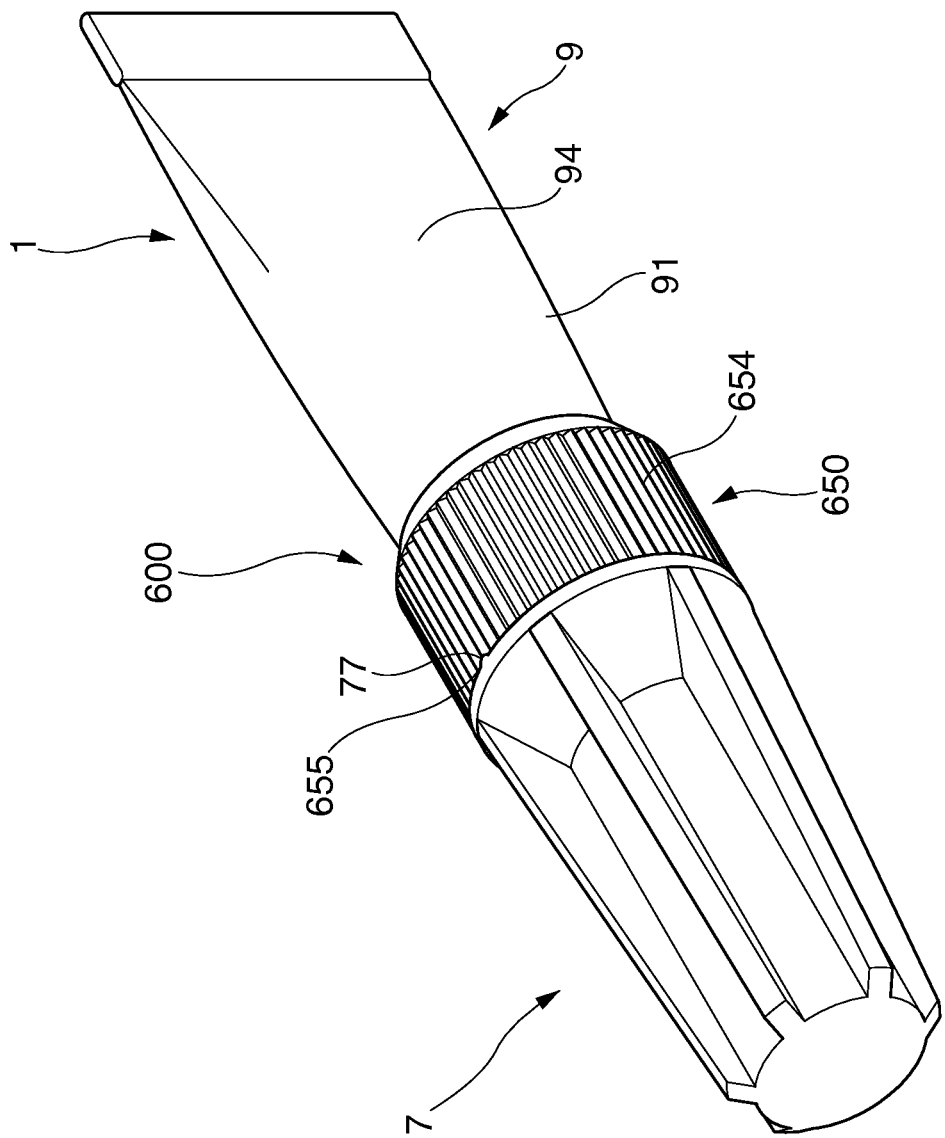
FIG. 22 is a perspective view of the second embodiment according to the present invention.
Figure 23:
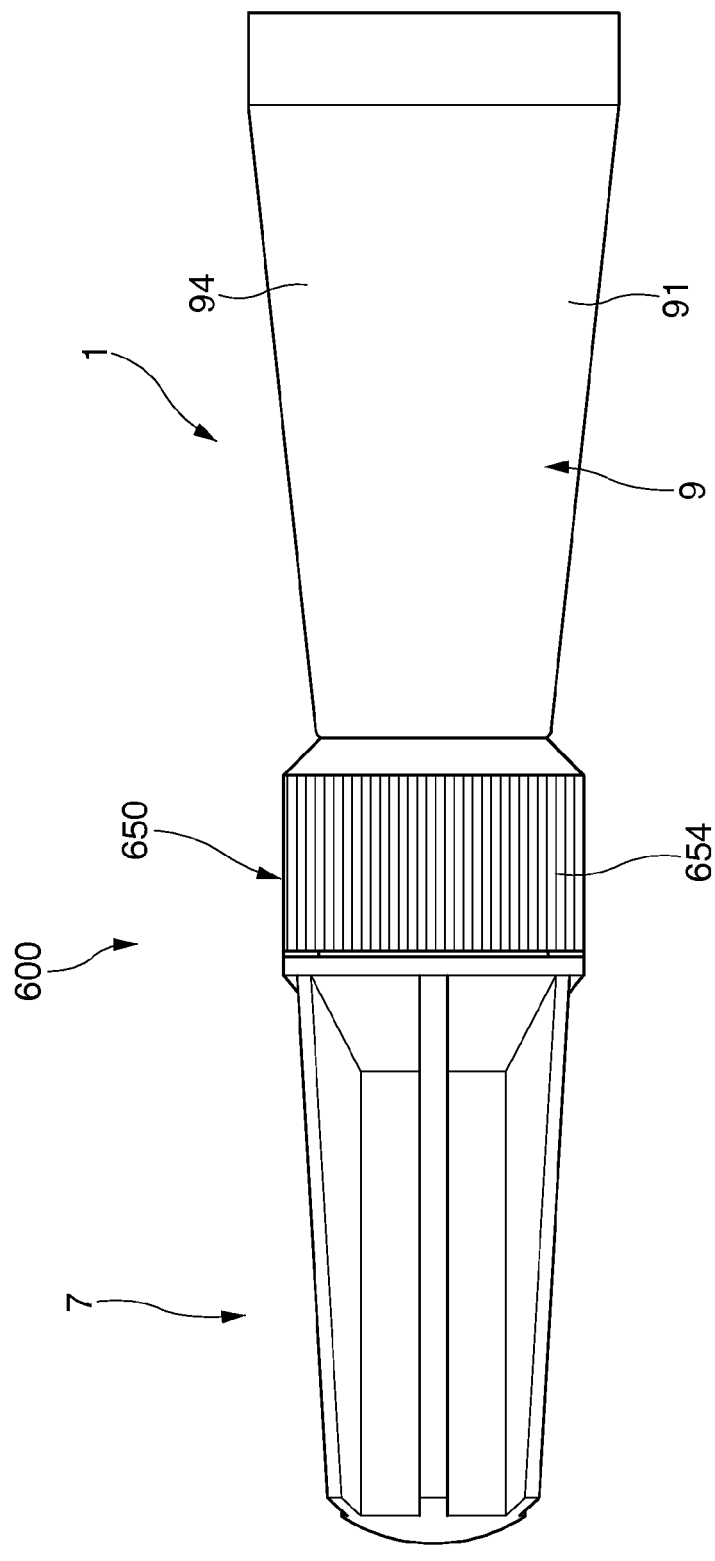
FIG. 23 is a front view of the second embodiment.
Figure 24:
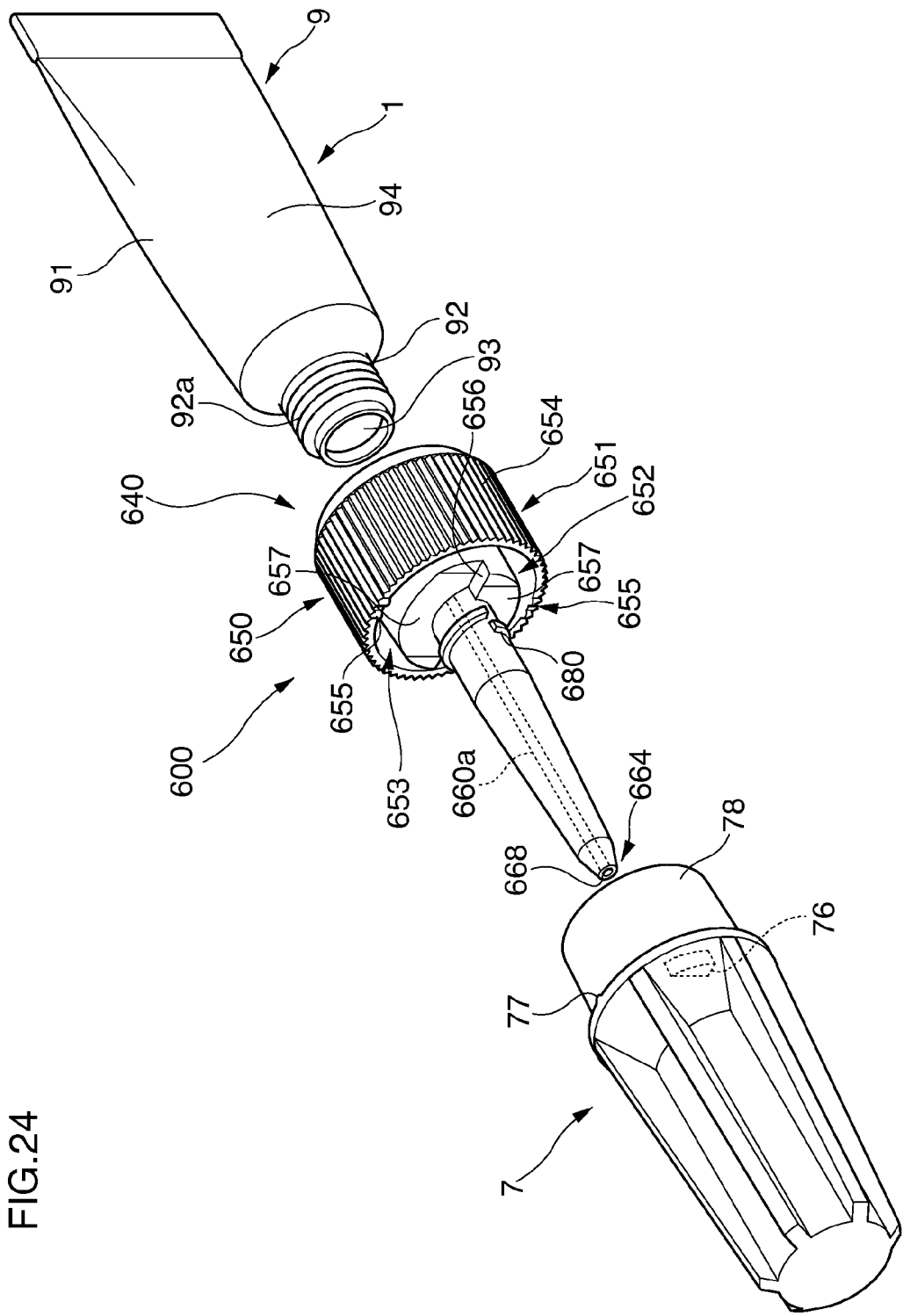
FIG. 24 is an exploded perspective view of the second embodiment.

As shown in FIG. 15, the adhesive B that is a content in the tube 9 is suitably extracted to the nozzle 6 without waste as described above when the button bodies 31 are pressed in a state of positioning the sharp edge 68a of the top portion 64 near the object. Here, the user can view the lead of the extracted adhesive B in the colored state (P) proceeding gradually inside of the see-through passage 6a clearly. Since the user is able to adjust operating force applied to the operation portion 34 while viewing the adhesive B that is approaching the top portion 64 before the adhesive B reaches the object, the user can easily grasp the timing of arrival of the adhesive B to the object as shown in FIG. 16. Also, since the orientation of the top end face 68 of the top portion 64 is the same as the orientation of the button body 31 of the push button 3, the user can easily adjust the orientation of the top end face 68. And, as shown in FIG. 21, desired amount of the adhesive B extracted from the top portion 64, more specifically from the position of the sharp edge 68a of the top end face 68 is applied to desired position and area. Of course, the applied adhesive B is irradiated with visible light VS being the light under natural conditions for a while and transits to the colorless state (Q) in which the adhesive B is approximately colorless after that. In this embodiment, since the thickness of the material that constitutes the top portion 64 is set to 0.3 mm or less, the amount of the adhesive B applied via the top portion 64 is controlled to very small amount and the user can correctly apply the adhesive B to desired minute points. That is, the nozzle 6 is capable of not only changing the width of the adhesive B to be applied, but also applying in dots to desired points with the top end face 68 directed upward. On the other hand, as shown in FIG. 18, if the user wants to enlarge the width of adhesive B to be applied, then the user may bring not only the sharp edge 68a but also the entire top end surface 68 into contact with the object while applying.

Figure 19:
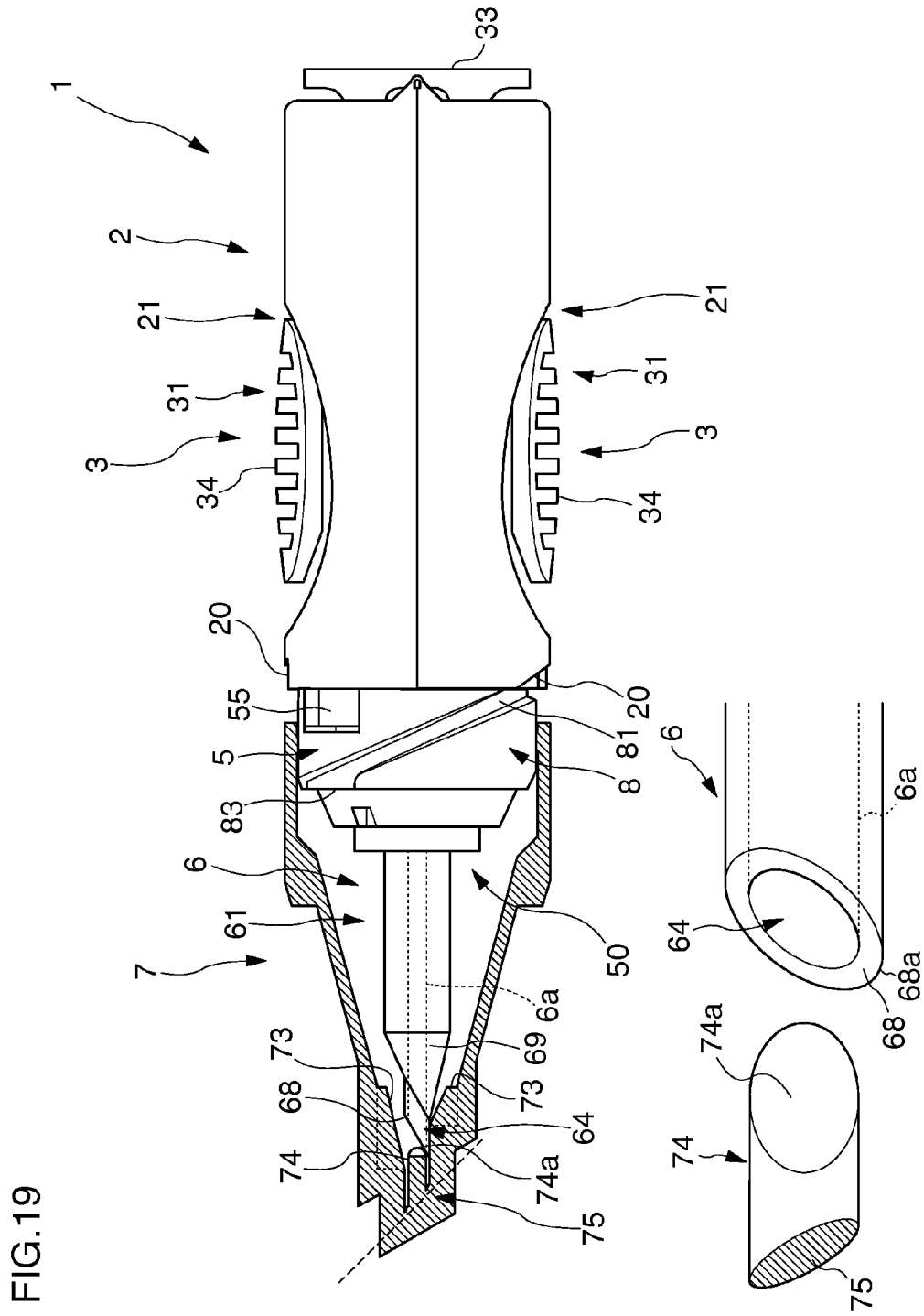
FIG. 19 is an explanatory diagram showing the movement of the first embodiment with an enlarged perspective view of a part thereof.
Figure 20:
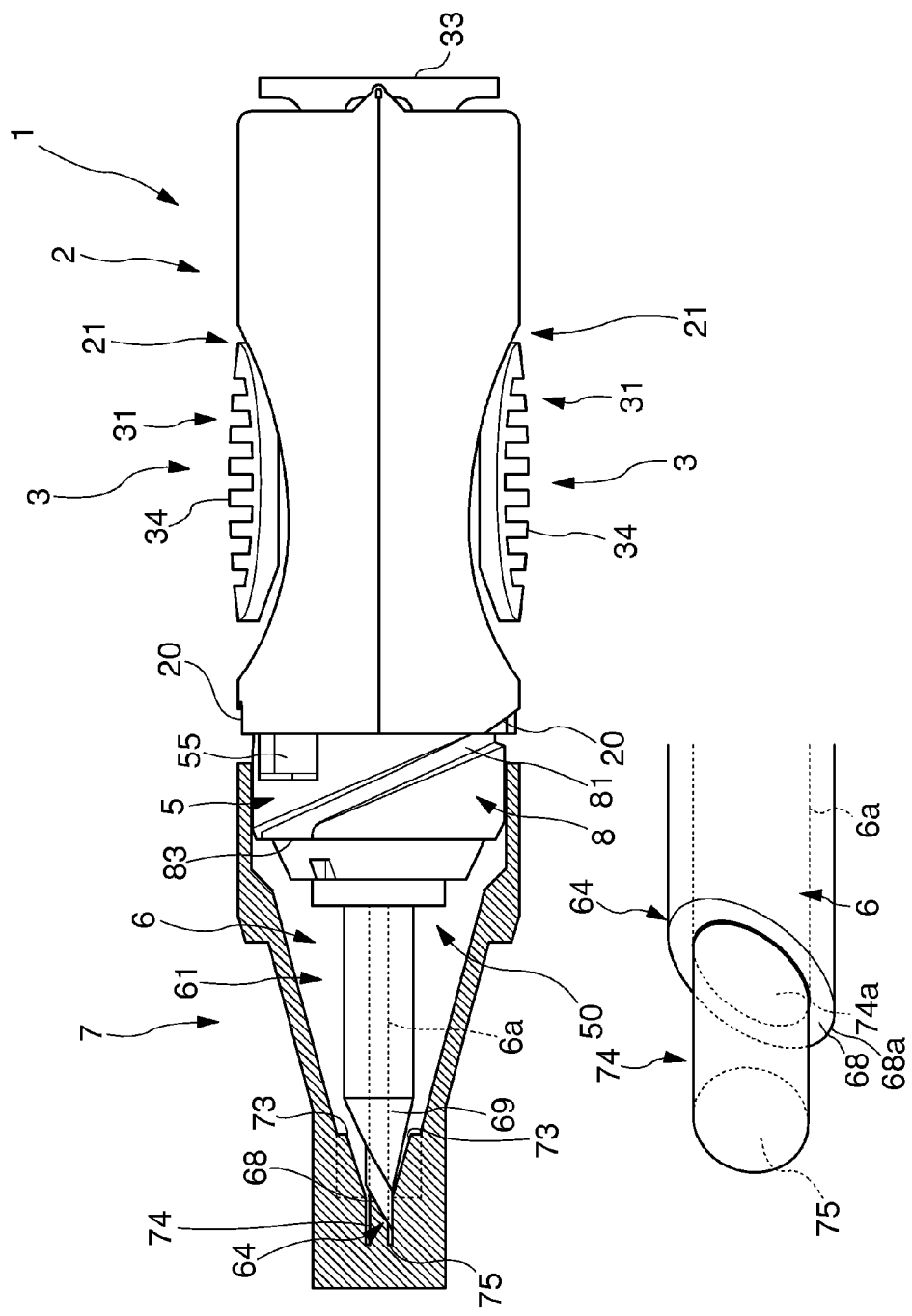
FIG. 20 is the same as above.

In the present embodiment, as shown in FIGS. 19 to 21, even though the user rotates the cap 7 from any orientation, screwing always starts from a starting position that is a uniform relative position and ends at an end position that is a uniform relative position.

At first, in the situation that the user lays the cap 7 over the nozzle 6 regardless of the orientation of the cap 7 and starts screwing the cap 7 back on, the second projection of the cap 7 is blocked by the step part 83 while rotating. Of course, the second projection is not put into the first screw groove 81 accidentally because the step part 83 is also formed on the start edge of the first screw groove 81. At the starting position illustrated in FIG. 19, the first projection 71 and the second projection are put in the first screw groove and the second screw groove 82 respectively, screw engagement starts after that. Now, the slanted top end 74a of the protrusion 74 faces the front side in the Figure and does not come into contact with the top portion 64 yet. As shown in FIG. 20, continuing rotation of the cap 7 results in proceeding of the first projection 71 along the first screw groove 81 and proceeding of the second projection along the second screw groove 82. As shown in FIG. 20, the top end face 68 of the nozzle 6 facing obliquely upward and the slanted top end 74a of the protrusion 74 facing obliquely downward are opposed to and have slight contact with each other, and besides the slanted top end 74a starts being inserted into the top portion 64 when the cap is screwed by 90 degrees from the starting position. Here, since the material that constitutes the top portion 64 has small thickness, which is a thickness of 0.3 mm to 0.5 mm, the top portion 64 may be slightly distorted or deformed, compared to the state illustrated in Figures. However, insertion of the protrusion 74 corrects the distortion and so on. Then, the cap 7 is positioned at the end position illustrated in FIG. 17 when the cap 7 with the first projection 71 proceeding in the first screw groove 81 and the second projection proceeding through the second screw groove 82 is rotated by 180 degrees from the starting position. At the end position, the first projection 71 of the cap 7 does not abut the end edge of the first screw groove 81, and the second projection of the cap 7 does not abut the end edge of the second screw groove 82. Instead the positioning parts 70 provided at different position from the first projection 71 and the second projection abut not the screw portion 8 but the cap stopper parts 20 provided on the accommodation portion of the container body 1. Hence, even if the user operates the cap 7 with strong operation force, it will be effectively avoided that the operation force affects the screw portion 8 and the middle cap 6. At this time, the top end face 68 come into close contact with or is within close proximity to the inclined rising area 75. And, the slanted top end 74a faces the rear side in the Figure; in other words, the direction of the slanted top end 74a is different by 90 degrees from the top end face 68. Therefore the contact area between the protrusion 74 and the top portion 64 is made small, the influence of the adhesive B upon the protrusion 74 is reduced to minimal when opening the cap 7.

Such configuration of the applicator product according to the embodiment facilitates controlling the amount of the adhesive B as the application material applied from the top portion 64 or the area where the adhesive B is applied to precisely, because the mounted cap 7 maintains the colored state (P) stably and the adhesive B guided from the see-through pass 6a to the top portion 64 in the nozzle 6 as the see-through nozzle is easily visible while the adhesive B is applied. Moreover, the area where the adhesive B is applied to is easily confirmed, the area where the adhesive B is not applied to is easily found out. Also, hence the adhesive B transits to the decolorized state by the light under natural conditions, the applicator product that is able to make the trace of the adhesive B inconspicuous can be fabricated.

In order to obtain the one that is able to maintain the colored state (P), the diarylethene-based photochromic compound is used as the photochromic compound according to the embodiment.

In order for the color due to the photochromic compound to be further reflected onto the colored state (P) of the adhesive B, the adhesive B according to the embodiment is added with 0.005 to 5.0 wt % of the photochromic compound in relation to cyanoacrylate as the base substance to which the photochromic compound is added.

In order to facilitate viewing the adhesive B more, the nozzle 6 according to the embodiment is integrally formed of the translucent resin.

In order to facilitate viewing the adhesive B in the colored state (P) especially when applied to the object and be able to apply it to the object accurately, the top portion 64 according to the embodiment is formed to be thin.

In order to facilitate controlling the position or the area where the adhesive B is applied to and contribute to more accurate applying, the top portion 64 according to the embodiment has the top end face 68 that is slanted relatively with the longitudinal direction of the nozzle 6.

The applicator product according to the present invention is capable of applying accurate amount of the liquid adhesive B, the problem that the adhesive B protrudes or oozes out of desired area is effectively avoided.

The adhesive B to be applied according to the embodiment is what is called an instant glue including cyanoacrylate, applied cyanoacrylate is easily viewed such that it is prevented from contacting the user's skin or clothes erroneously.

In order to ensure transit to the decolorized state when it is irradiated with the light under natural conditions, the application material according to the embodiment includes the ultraviolet absorber. Hence, the decolorized state is maintained in a more effective manner, and besides the application material can be effectively prevented from redeveloping the color by irradiation of light under natural conditions having a higher content by percentage of ultraviolet light.

And, in order to emphasize the difference in color between the area where the adhesive B is applied to and the area where it is not applied to on the object so as to show the area where the adhesive B is applied to clearly and attract the user's attention as well as to prevent the adhesive B just after applied from contacting the user erroneously, the adhesive B according to the embodiment is added with the photochromic compound that exhibits red in the colored state (P), more specifically, the diarylethene-based photochromic compound that exhibits red through the ring-closure reaction by irradiation with ultraviolet light.

Second Embodiment

Described below is the second embodiment of the present invention. The elements in this embodiment that are equivalent to the ones described in the above embodiment are given the same reference signs thereas, the description thereof is omitted. While the applicator product according to the above-disclosed first embodiment is such that the accommodation portion 2 accommodates the tube 9 filled with the adhesive B so as to constitute the container body 1 as shown in FIGS. 1 to 21, of course the present invention is not limited to the mode of the first embodiment. In order to reduce the number of components, an applicator product according to the present invention has the below configuration. Illustrations of the adhesive B in Figures are omitted in the second embodiment and variations described below.

As shown in FIGS. 22 to 26, the applicator product according to the embodiment includes the tube 9 filled with the adhesive B that functions as a container body 1 itself, a screw nozzle 600 being a see-through nozzle that has functions of the nozzle 6, the middle cap 5 and the inner cap 4 in the above first embodiment, and a cap 7 being a light shielding cap to be mounted on the screw nozzle 600.

The tube 9 constituting the container body 1 according to this embodiment has the same configuration as the tube in the above first embodiment. That is, the tube 9 has the tube body 91 that is made of, for example, the aluminum sheet molded into a film and is formed to the state of sealing and holding the adhesive B, the attachment screw part 92 that is formed into the male screw shape with a right-hand thread 92a on one end side of the tube body 91, and the extracting face 93 that is composed of the aluminum material molded thin at one end side of the attachment screw part 92. The extracting face 93 enclosed by the attachment screw part 92 allows the adhesive B being extracted to the outside in the state of breaking the aluminum material. The configuration of the tube 9 is designed to hold, for example, existing adhesive B or medicine in gel state and such. That is, the tube 9 can be used as a container in itself. In this case, the application material, namely, the adhesive B is able to extracted to the outside of the tube 9 from the place where the aluminum material is broken of the extracting face 93 by pressing belly parts 94 with fingers and so on. Each of the belly parts 94 is flatly formed on the periphery of the tube body 91 so as to constitute the front and rear surface respectively.

The screw nozzle 600 is integrally molded of, for example, the same transparent or translucent material as the nozzle described above so that the adhesive B is visible from outside as well as the nozzle described above. The screw nozzle 600 has an inner cap part 640 that is capable of being attached to the tube 9 as the container body 1, a middle cap part 650 that is capable of positioning the cap 7, and a nozzle part 660 to be shielded by the mounted cap 7.

The inner cap part 640 is intended to fix the tube 9. The inner cap part 640 has an internal thread part 641 where a right-hand thread 641a is formed to be engaged with the attachment screw part 92 of the tube 9, and a fitted face 642 to abut the top end of the attachment screw part 92 and position the tube 9.

The middle cap part 650 is intended to position the bottom side of the cap 7. The middle cap part 650 has a outer cylinder 651 that is able to cover a bottom end part 78 on the bottom end side of the cap 7 described below, and a cap stopper 652 that is able to position the cap 7 and be pressed against the cap 7, a receiving recess part 653 formed between the outer cylinder 651 and the cap stopper to receive the bottom end part 78 of the cap 7. Knurls 654 are formed on a part of the surface of the outer cylinder 651. The outer cylinder 651 has two pairs of climbed ribs 655 that are provided at two positions opposed to each other on the top end face of the outer cylinder 651 in addition to the knurls 654. The climbed ribs 655 are to be engaged with the cap 7 by a concavo-convex engagement and give a user the feel of closing the cap 7 when the cap 7 arrives at an end position. The knurls 654 are formed all over the periphery of the outer cylinder 651 to prevent slipping when the user pinches any position of the outer cylinder 651. Each pairs of the climbed ribs 655 consists of two protrusions, one of the protrusions transmits vibration to the user's fingers when a climbing protrusion 77 of the cap 7 described below climbs over it, the other protrusion abuts the climbing protrusion 77 so as to position the cap at the end position where the operation for screwing the cap 7 back on is finished. The cap stopper 652 has stopping faces 656 to be brought into contact with pushing faces 76 of the cap 7 described below so as to position the cap 7, and inclining faces 657 to be brought into contact with an inside face of the cap 7 and able to guide opening/closing movement of the cap 7. In a state of positioning the cap 7, the stopping faces 656 are further pushed by the pushing faces 76 and enables screwing operation to the tube 9. The receiving recess part 653 is a circular groove to receive the bottom end part 78 of the cap 7 without backlash. A bottom face 658 at the bottom of receiving recess part 653 is provided that is able to overlap with the attachment screw part 92 of the tube 9 in a front view. Hence, the cap 7 at an end position is able to approximately cover the attachment screw part 92 and shield the vicinity of the attachment screw part 92 against light.

The nozzle part 660 of the screw nozzle 600 as the see-through nozzle according to the embodiment has a top portion 664 protruding from the tube 9 as the container body 1 to apply the adhesive B onto an object, and a see-through passage 660a that guides the adhesive B from the tube 9 toward the top portion 664. At least a part of the see-through passage 660a including the top portion 664 is translucent so that the adhesive B is visible from outside.

The nozzle part 660 has a nozzle body 661 projected from the middle cap part 650 and the inner cap part 640 toward the cap 7, and an extraction pipe 663 protrudes from the inner cap part 640 toward the tube 9 to extract the adhesive B. The nozzle body 661 includes the top portion 664 having a top end face 668 that is formed by cutting the top end side of the top portion 664, a taper part 669 that is tapered to decrease the diameter toward the top portion, and a thread part 680 on the bottom end side of the nozzle body that is capable of being engaged with the cap.

Figure 25:
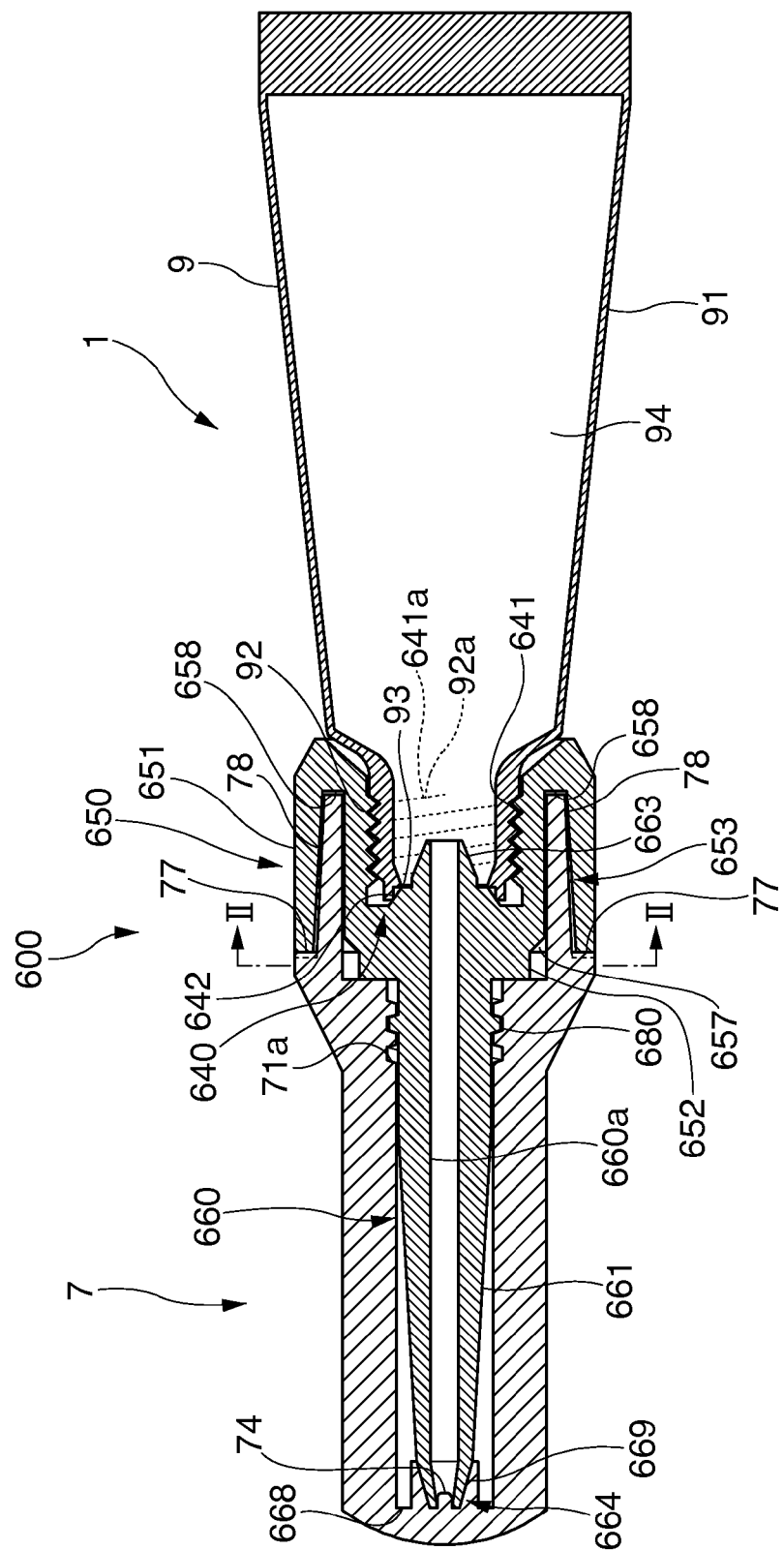
FIG. 25 is a front cross-sectional view taken along the center line of the second embodiment.

On the other hand, the cap 7 as the light-shielding cap is detachably mounted on the tube 9 to shield the adhesive B as the application material in the see-through passage 660a from visible light. As shown in FIG. 25, the cap 7 is screwed so that the cap 7 is able to cover the nozzle part 660 and the attachment screw part 92 being the top end part of the tube 9. The cap 7 is integrally molded of, for example, resin having opacity. The cap 7 has a spiral groove 71a that is formed by making the inner face hollow, the pushing faces 76 that protrude on the inner face, a protrusion 74 that is able to be inserted into the nozzle 6, the bottom end part 78 that is able to be received by the receiving recess part 653, and the climbing protrusions 77 that are able to be engaged with the middle cap part 650 at the end position.

The spiral groove 71a is a groove formed into an approximate spiral shape with a depth and a width corresponding to the above screw portion 680. The pushing faces 76 are provided to rise up from the inner face of the cap 7. The pushing faces 76 can effectively retain the end position by coming into contact with the stopping faces 656 of the middle cap part 650 at the end position. The protrusion 74 protrudes from the top end part inside the cap 7 along the axis, in other words, the forward and backward direction along which the cap 7 moves while screwed. The protrusion 74 is configured so that it is difficult for the protrusion 74 to interfere with the shape of the top portion 664 of the nozzle 600.

In the present embodiment, even though the user rotates the cap 7 from any orientation, relative position of the spiral groove 71a to the thread part 680 is adjusted properly so that screwing ends at the predetermined end position.

Figure 26:
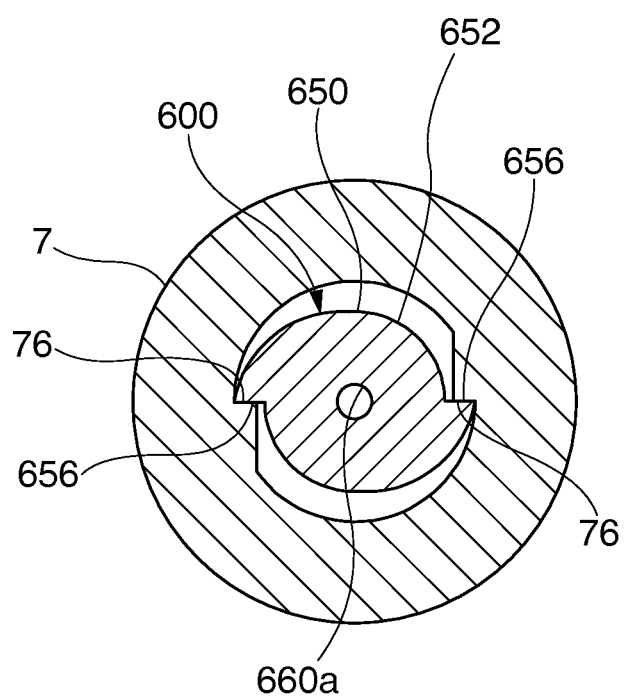
FIG. 26 is an end view taken along the line II-II of the second embodiment.
Figure 27:
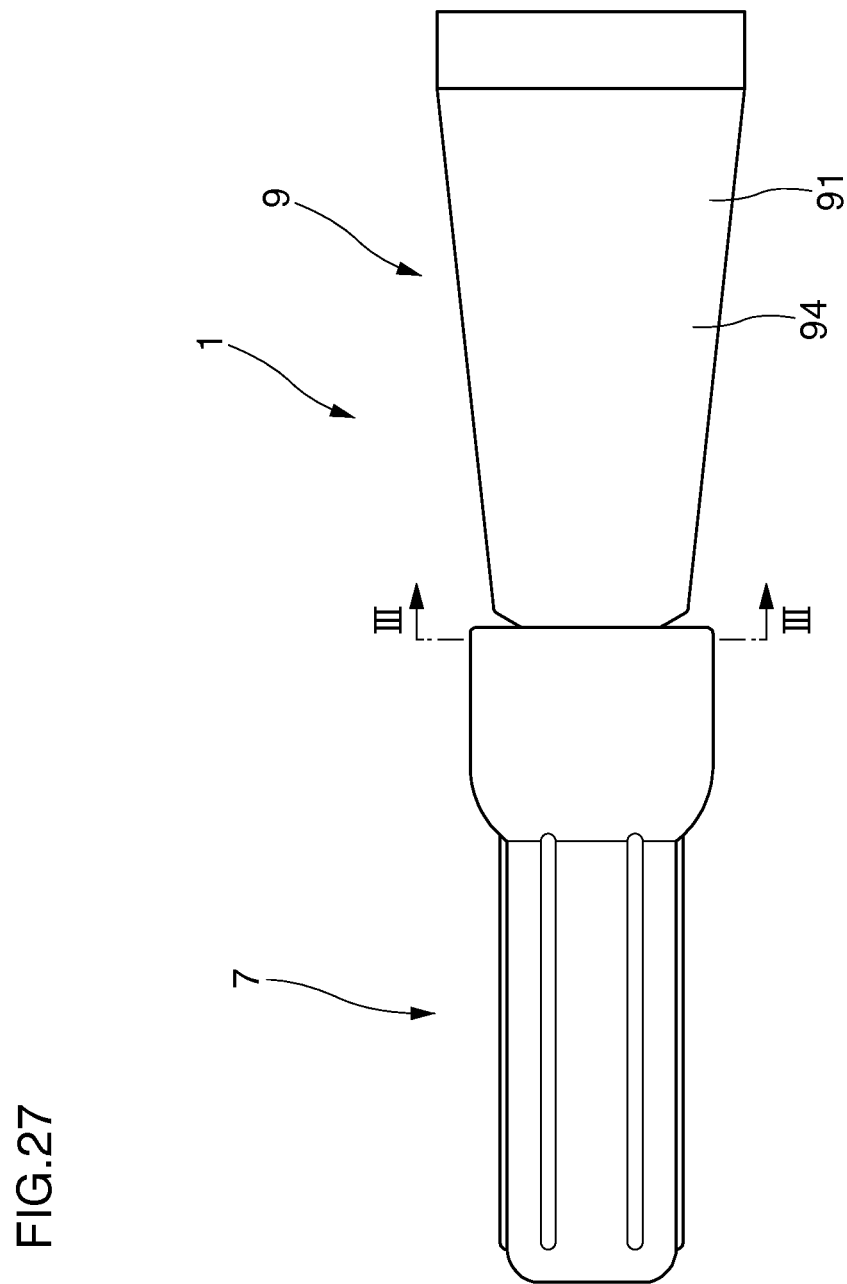
FIG. 27 is a front view showing the first variation of the second embodiment.
Figure 28:
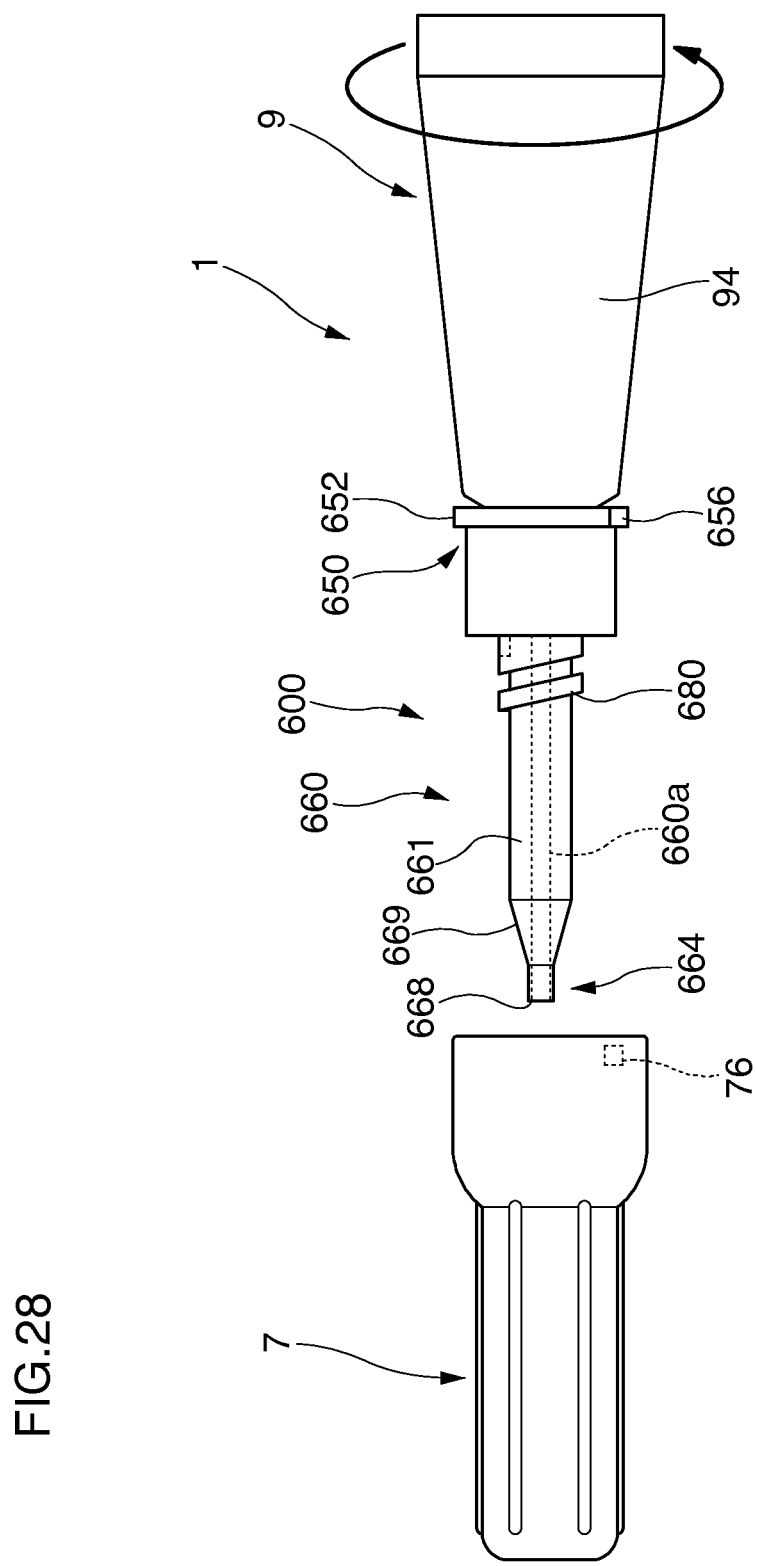
FIG. 28 is an explanatory diagram showing the configuration of the first variation.
Figure 29:
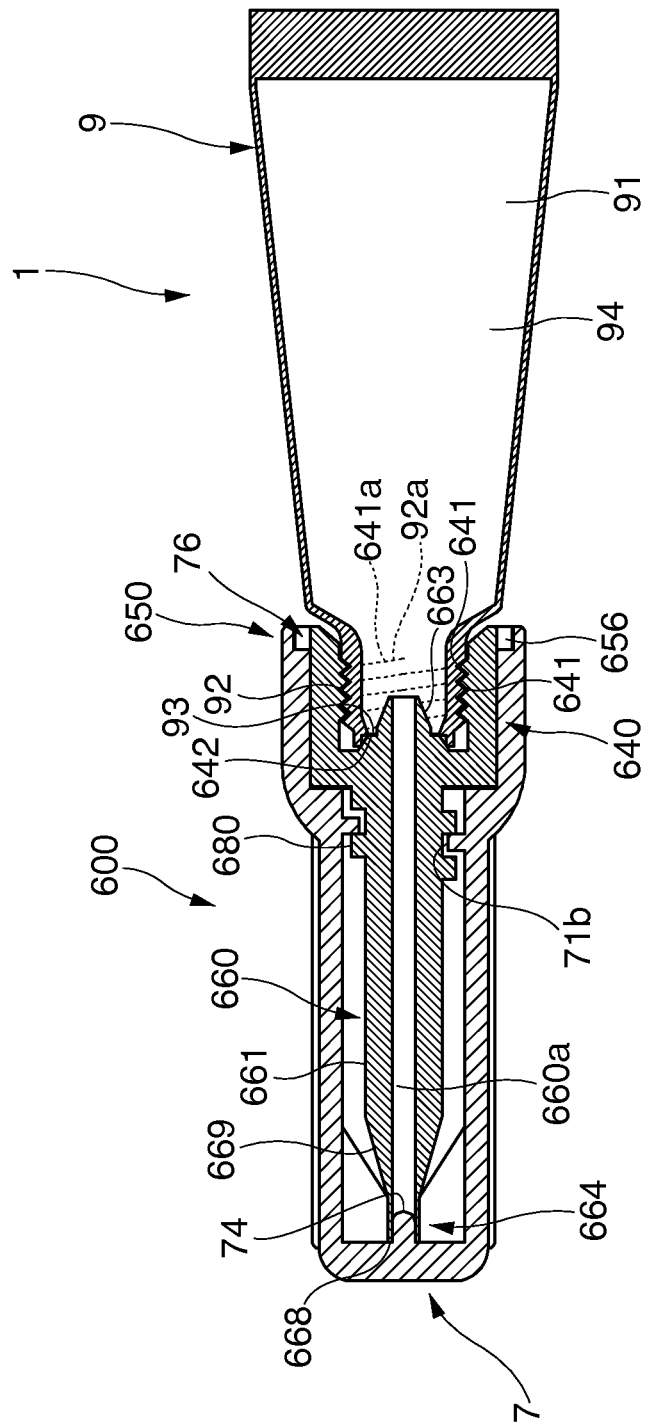
FIG. 29 is a front cross-sectional view taken along the center line of the first variation.
Figure 30:
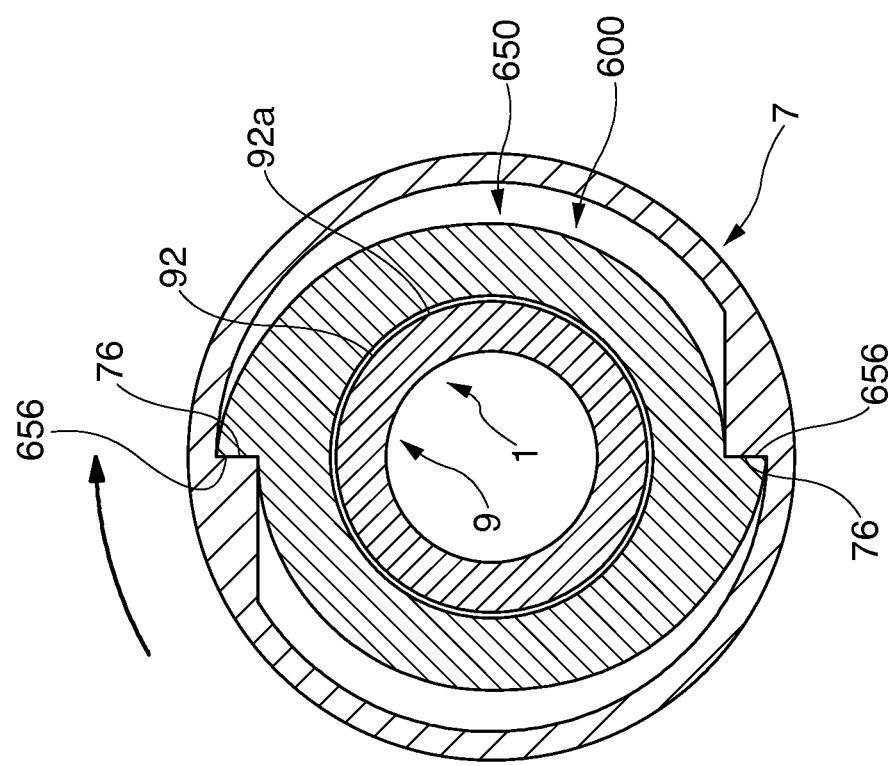
FIG. 30 is an end view taken along the line III-III of the first variation.

According to this embodiment, the cap 7 is in a state of being screwed to the screw nozzle 600, positioned at the end position, and separated from the tube 9 as the container body 1 before use, for example, while shipping. And, after the cap 7 and the screw nozzle 600 in this state are rotated clockwise relatively with the attachment screw part 92 of the tube 9, it becomes possible for the adhesive B in the tube B to be extracted through the extraction pipe 663 of the screw nozzle 600, in other words, the applicator product is ready for use. Because the state where the pushing faces 76 and the stopping faces 656 contact each other is maintained at the end position as shown in FIG. 26. Thus, the screw nozzle 600 is thrust into the tube 9 without delay only by screwing the cap 7.

When the user screws the cap 7, particularly to open the cap 7, the user can avoid holding the belly part 94 of the tube 9 and pushing the tube 9 itself by holding the outer cylinder 651. Thereby the problem that the adhesive B is carelessly discharged as soon as removing the cap 7 can be prevented.

As with the first embodiment, such configuration of the applicator product according to this embodiment facilitates controlling the amount of the adhesive B as the application material applied from the top portion 664 or the area where the adhesive B is applied to precisely, because the mounted cap 7 maintains the colored state (P) stably and the adhesive B guided from the see-through pass 660a to the top portion 664 in the screw nozzle 600 as the see-through nozzle is easily visible while the adhesive B is applied. Moreover, the area where the adhesive B is applied to is easily confirmed, the area where the adhesive B is not applied to is easily found out. Also, hence the adhesive B transits to the decolorized state (Q) by the light under natural conditions, as with the first embodiment, the applicator product that is able to make the trace of the adhesive B inconspicuous can be provided.

<First Variation>

Described below are variations of the second embodiment. The elements in the variations that are equivalent to the ones described in the above embodiments are given the same reference signs thereas, the description thereof is omitted.

In the second embodiment, the outer cylinder 651 is provided to be a portion preferentially held by the user. But of course, it may be configured without the outer cylinder 651.

Specifically, an applicator product according to the first variation shown in FIGS. 27 to 30, as with the second embodiment described above, has the tube 9 as the container body 1, the cap 7, and the screw nozzle 600. However, the outer cylinder 651 and the receiving recess part 653 are omitted from the screw nozzle 600, the cap 7 is provided with a spiral ridge 71b instead of the spiral groove 71a, the spiral ridge 71b performing similar function to the spiral groove 71a. A stopping face 656 is formed on the bottom end side of the middle cap part 650, a pushing face 76 is formed on the inner face of the bottom edge of the cap 7. Since the cap is positioned at the end position where the cap covers most of the screw nozzle 600, the cap 7 covers the attachment screw part 92 covered by the screw nozzle 600 in a plane view. Thus, the vicinity of the attachment screw part 92 is surely shielded from light.

Such configuration performs the same function and produces the same effect as the first embodiment and the second embodiment.

<Second Variation>

In the second embodiment and the first variation, the rotation of the cap 7 causes the rotation of the screw nozzle 600 relative to the tube 9 with the pushing face 76 and the stopping face 656 and makes the applicator product ready for use. But of course, the present invention is not limited to the configuration. That is, the configuration may be employed in which the extraction pipe 663 of the screw nozzle 600 is prevented from penetrating the tube 9 inordinately when the cap 7 is rotated beyond the end position.

Figure 31:
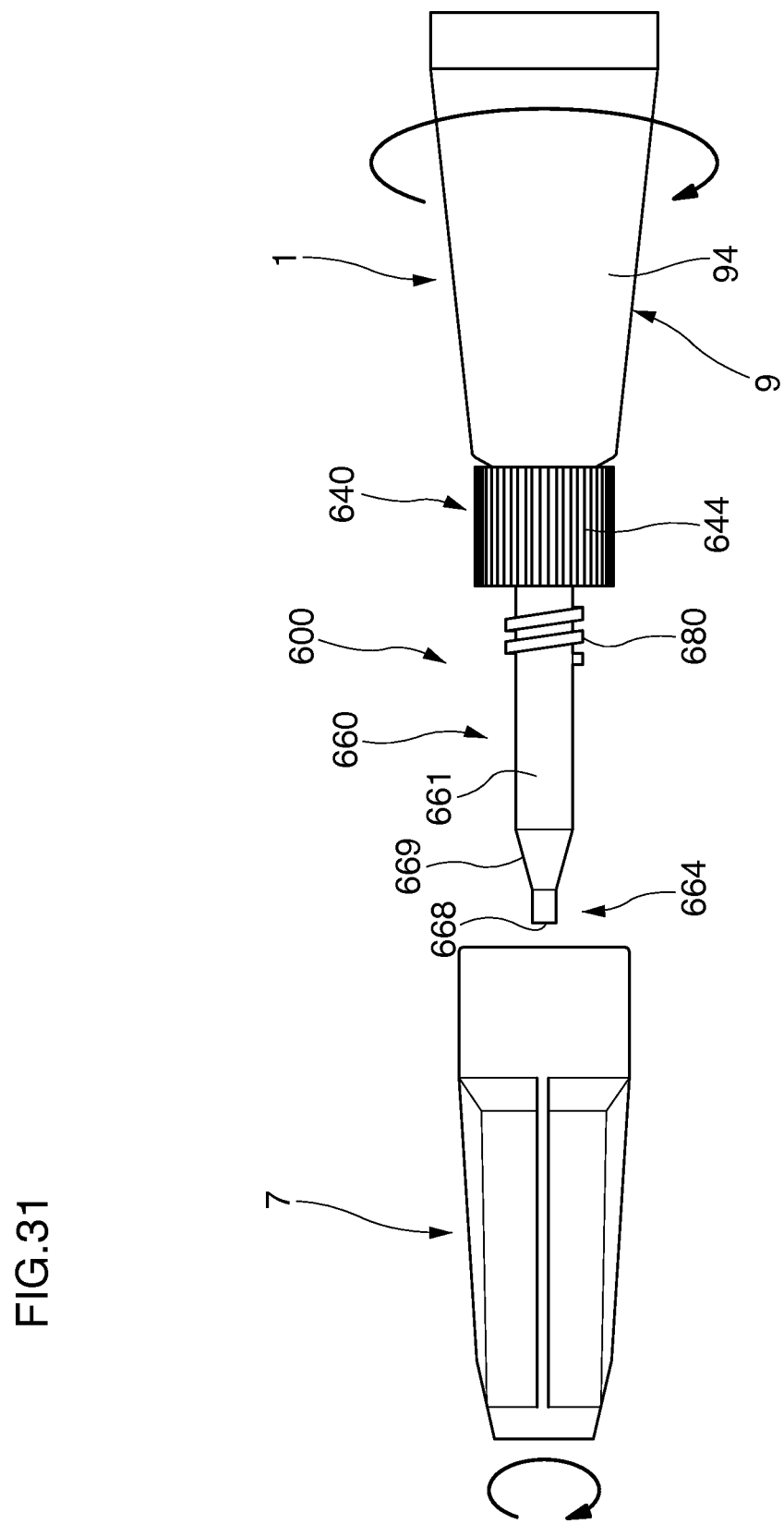
FIG. 31 is an explanatory diagram showing the configuration of the second variation of the second embodiment.
Figure 32:
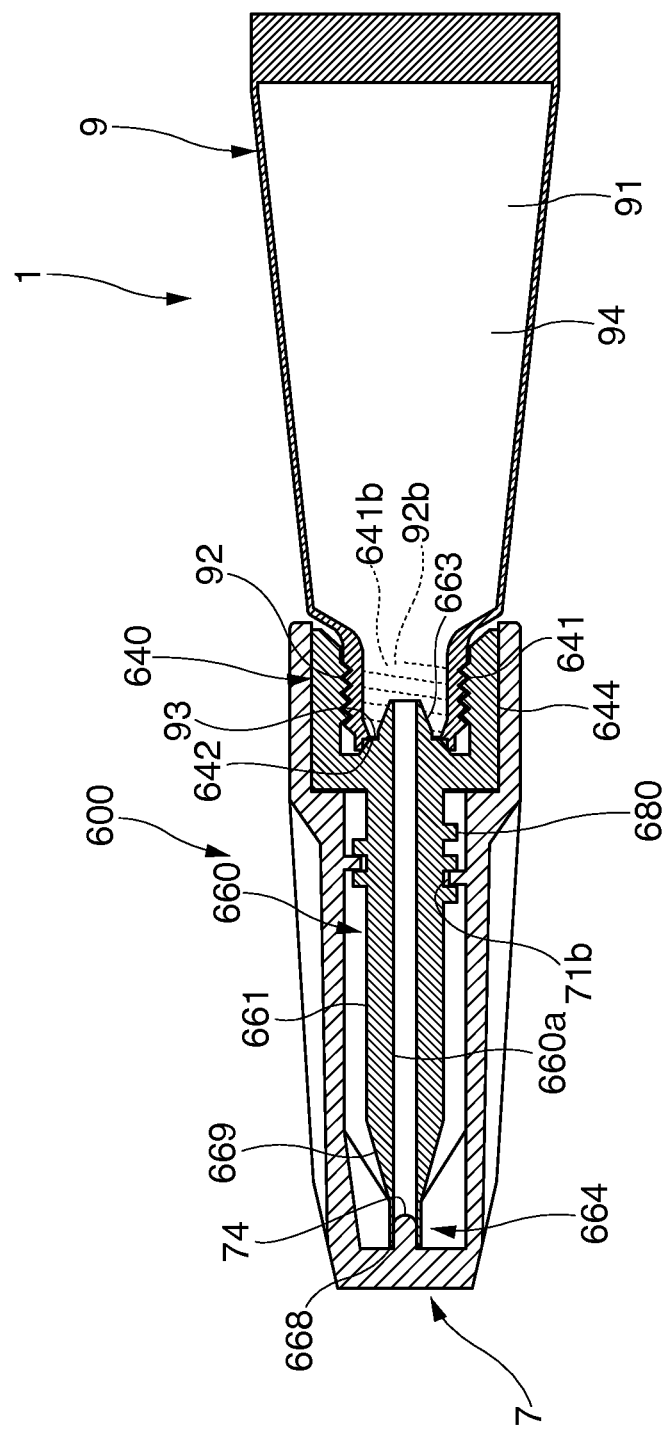
FIG. 32 is a front cross-sectional view taken along the center line of the second variation.

Specifically, an applicator product according to the second variation shown in FIGS. 31 and 32, unlike the second embodiment and the first variation described above, both of the pushing face 76 on the cap 7 and the middle cap part 650 on the screw nozzle 600 are omitted. Also, a left-hand thread 92b is formed on the attachment screw part 92, and besides a left-hand thread 641b is formed on the internal thread part 641 of the inner cap part 640. Hence, screwing the attachment screw part 92 to the internal thread part 641 proceeds by rotating in the reverse direction of the direction in which the cap 7 is rotated to screw the cap 7 back on.

With such configuration, the screw engagement of the left-hand thread 92b with the left-hand thread 641b will not proceed even if the cap 7 is rotated beyond the end position. Consequently the extraction pipe 663 of the screw nozzle 600 is prevented from penetrating the tube 9 inordinately.

<Third Variation>

Figure 33:
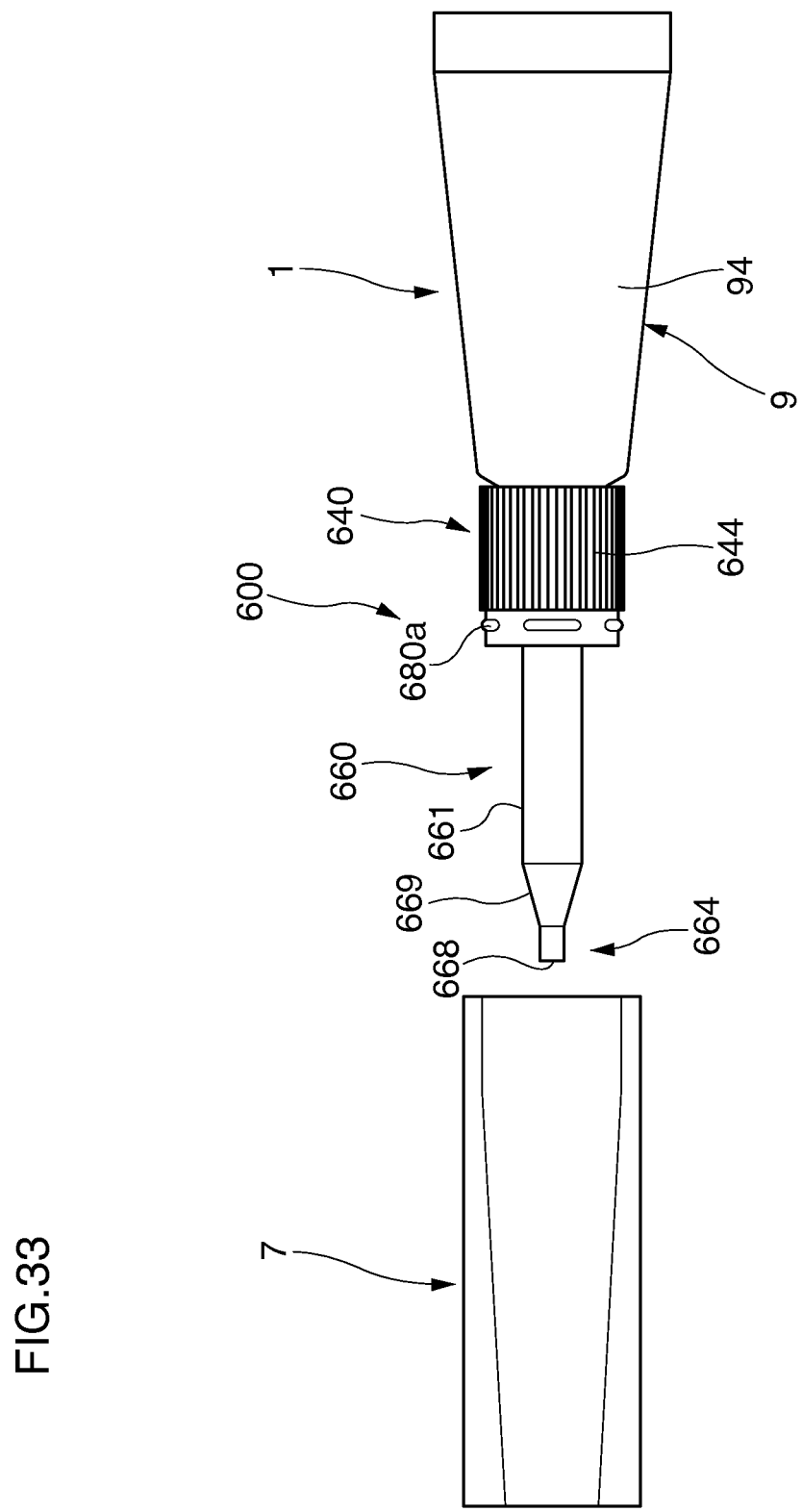
FIG. 33 is an explanatory diagram showing the configuration of the third variation of the second embodiment.
Figure 34:
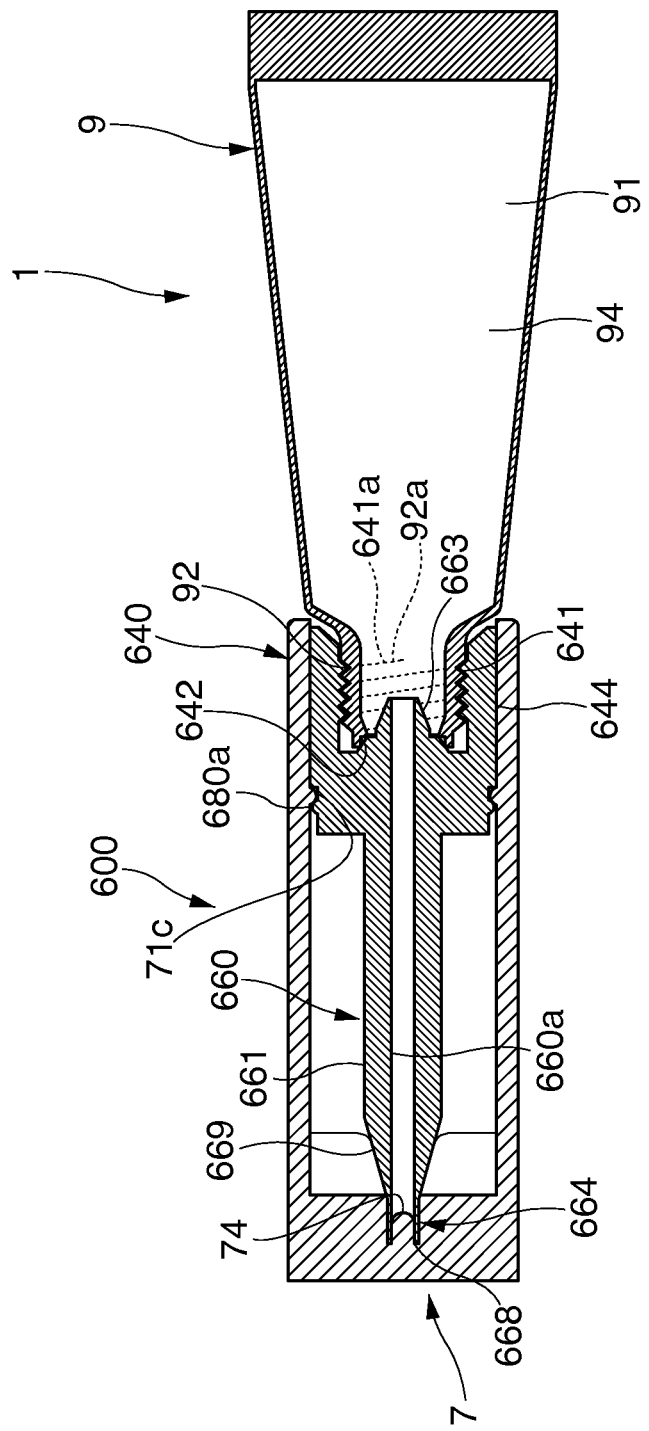
FIG. 34 is a front cross-sectional view taken along the center line of the third variation.

In the second variation, the extraction pipe 663 of the screw nozzle 600 can be prevented from penetrating the tube 9 inordinately with the right-hand thread 92a formed on the attachment screw part 92 in the second variation. Of course, as shown in FIGS. 33 and 34, it is possible for the extraction pipe 663 of the screw nozzle 600 to be prevented from penetrating the tube 9 inordinately even though the tube 9 has the right-hand thread 92a in general use.

Specifically, an applicator product according to the third variation, unlike the second variation described above, the tube 9 includes the attachment screw part 92 having the right-hand thread 92a. In this variation, fitting ribs 680a are provided to be formed brokenly on an outer peripheral surface of the inner cap part 640, and besides engagement ribs 71c are provided to be formed brokenly on an inner peripheral surface of the cap instead of forming the thread part 680 on the nozzle part 660. The cap 7 arrives at the end position where the cap 7 is engaged with the screw nozzle 600 after halfway elastic deformation of the cap 7 and the screw nozzle 600.

With such configuration, the screw engagement of the right-hand thread 92a with the right-hand thread 641a will not proceed even if the cap 7 is rotated beyond the end position. Consequently the extraction pipe 663 of the screw nozzle 600 is prevented from penetrating the tube 9 inordinately.

While the embodiments and the variations of the present invention are described above, the concrete structures of the respective components are not limited to the above-described embodiments, and various modifications are possible without departing from the scope and spirit of the present invention.

For example, although modes of applicator products such as what is called an instant glue have been disclosed in each of the embodiments described earlier, of course an applicator product according to the present invention is not limited to these embodiments described earlier. In addition, it is possible to have a configuration wherein the applicator product uses an application material of a so-called multi-purpose adhesive such as a urethane-based adhesive or a rubber-based adhesive solvent, etc., an adhesive for wood such as a vinyl acetate resin-based emulsion, etc., or a water-based adhesive such as liquid glue, etc. Furthermore for example, it is possible for a configuration where ink is used as the application material and the applicator product is capable of being used as a writing material, or a configuration where grease is used as the application material and the applicator product is used as a so-called spray grease capable of spraying this grease, etc. to suitably configure an applicator product of the present invention as long as the product is one that applies a material onto a subject. In addition, it is possible for the photochromic compound capable of being utilized with the present invention to be a photochromic compound that is spiropyran-based, spirooxazine-based, fulgides-based, cyclophane-based, or azobenzene-based or other compounds, as long as the compound exhibits color when an ultraviolet light having a certain wavelength is irradiated thereon and becomes colorless when a light of natural conditions is irradiated thereon. Also, the specific modes of each part, such as the shape of the container for the application material or the configuration of the light-shielding case, are not limited to those of the embodiments that have been described in the above, and it is possible to apply various modes including those that are preexistent.

Other than that, the concrete structures of the respective components are not limited to the above-described embodiments, various modifications are possible without departing from the scope and spirit of this invention.

INDUSTRIAL APPLICABILITY

The present invention is capable of being utilized as an applicator product for applying an application material such as glue or adhesive, etc. onto an object.

DESCRIPTION OF THE REFERENCE NUMERAL

P colored state
Q decolorized state
B application material (adhesive)
1 container body
64, 664 top portion
6a, 660a see-through pass
6 see-through nozzle (nozzle)
600 see-through nozzle (screw nozzle)
7 light-shielding cap (cap)

The invention claimed is:
1. An applicator product comprising:
an application material to which a photochromic compound that develops a color by irradiation of ultraviolet light with a certain wavelength and is decolorized by irradiation of light under natural conditions is added so that the application material transits from colored state to decolorized state when it is irradiated with the light under natural conditions;
a container body that contains the application material in the colored state and shields the application material from visible light;
a see-through nozzle that has a top portion projecting from the container body to apply the application material to an object, and a see-through passage provided in at least a part including the top portion to guide the application material from the container body to the top portion, the see-through passage being transparent or translucent so that the application material is visible from outside; and
a light-shielding cap being attached to the container body or the see-through nozzle to shield the application material in the see-through passage from visible light.
2. The applicator product according to claim 1, wherein the photochromic compound comprises a diarylethene-based photochromic compound.
3. The applicator product according to claim 2, wherein the application material is a liquid adhesive,
the adhesive includes cyanoacrylate.
4. The applicator product according to claim 1, wherein the application material includes the photochromic compound added by 0.005 to 5.0 wt % based on a base substance.
5. The applicator product according to claim 1, wherein the see-through nozzle is integrally formed of a translucent resin.

6. The applicator product for adhesive according to claim 5, wherein
the top portion is formed to be thin.

7. The applicator product according to claim 1, wherein the top portion has a top end face that is slanted relative to the longitudinal direction.

8. The applicator product according to claim 1, wherein the application material comprises a liquid adhesive.

9. The applicator product according to claim 8, wherein the adhesive includes cyanoacrylate.

10. The applicator product according to claim 9, wherein the application material exhibits red in the colored state.

11. The applicator product according to claim 1, wherein the application material includes an ultraviolet absorber.

12. The applicator product according to claim 1, wherein the application material exhibits red in the colored state.

* * * * *